US012171380B1

(12) United States Patent
Krause et al.

(10) Patent No.: US 12,171,380 B1
(45) Date of Patent: Dec. 24, 2024

(54) SCRUBBING TOOL SYSTEM HAVING A STORAGE AND MOLDING DEVICE, AND A MOLDABLE AND DISSOLVABLE CLEANING HEAD

(71) Applicant: Scrub Daddy, Inc., Pennsauken, NJ (US)

(72) Inventors: Aaron Krause, Pennsauken, NJ (US); Jared Sobel, Pennsauken, NJ (US); Evan Bennis, Pennsauken, NJ (US); Aleksandrs Titovs, Pennsauken, NJ (US)

(73) Assignee: SCRUB DADDY, INC., Pennsauken, NJ (US)

( * ) Notice: Subject to any disclaimer, the term of this patent is extended or adjusted under 35 U.S.C. 154(b) by 0 days.

(21) Appl. No.: 18/629,229

(22) Filed: Apr. 8, 2024

(51) Int. Cl.

| | |
|---|---|
| ***A47K 11/10*** | (2006.01) |
| ***A47L 13/51*** | (2006.01) |
| ***E03D 9/00*** | (2006.01) |
| ***E03D 9/02*** | (2006.01) |
| *A47L 13/22* | (2006.01) |
| *A47L 13/24* | (2006.01) |
| *A47L 13/46* | (2006.01) |
| *C11D 3/48* | (2006.01) |
| *C11D 17/04* | (2006.01) |

(52) U.S. Cl.
CPC .............. *A47K 11/10* (2013.01); *A47L 13/51* (2013.01); *E03D 9/005* (2013.01); *E03D 9/022* (2013.01); *A47L 13/22* (2013.01); *A47L 13/24* (2013.01); *A47L 13/46* (2013.01); *C11D 3/48* (2013.01); *C11D 17/044* (2013.01)

(58) Field of Classification Search
CPC ......... A47K 11/10; E03D 9/032; E03D 9/022; E03D 9/005; E03D 2009/026; A47L 13/58-59; A47L 13/51
See application file for complete search history.

(56) References Cited

U.S. PATENT DOCUMENTS 10,344,462 B2 * 7/2019 Soller ..................... E03D 9/032
2015/0282689 A1 * 10/2015 Ngan ..................... A47J 47/18 15/264

FOREIGN PATENT DOCUMENTS

WO WO 2012/032319 * 3/2012 ............ A47K 11/10

* cited by examiner

*Primary Examiner* — Laura C Guidotti
(74) *Attorney, Agent, or Firm* — Troutman Pepper Hamilton Sanders LLP

(57) ABSTRACT

A scrubbing tool system includes a handle, a moldable and dissolvable cleaning head, and a storage and molding device. The handle is for holding by a user in a cleaning operation and has a projecting portion. The moldable and dissolvable cleaning head has a cavity to mate with the projecting portion to attach the cleaning head to the handle. The cleaning head is made of a moldable material that dissolves in water and includes a cleaning agent. The storage and molding device is movable from a storing position to a shaping position to attach the cleaning head to the handle. The storage and molding device has a base, a receiving surface, and a plurality of shaping tabs that connect the receiving surface and the base. The shaping tabs curve up from the receiving surface, thereby forming with the receiving surface a cup in which the cleaning head is received.

14 Claims, 23 Drawing Sheets

SCRUBBING TOOL SYSTEM HAVING A STORAGE AND MOLDING DEVICE, AND A MOLDABLE AND DISSOLVABLE CLEANING HEAD

TECHNICAL FIELD

The present disclosure is directed to a scrubbing tool system and, more particularly, a multi-functional in-toilet system having an in-toilet bowl shaper for shaping a moldable and dissolvable cleaning head while it is being attached to a scrubbing handle and storing the cleaning head in the toilet bowl to clean and refresh the bowl in between such scrubbing uses.

BACKGROUND

Cleaning supplies are often designed for specific applications for user convenience. Many cleaning supplies have a cleaning agent built-in to the end product so that the consumer can use the product out of the package. The cleaning agent may be part of a pre-wet packaging (e.g., cleaning wipes) or may be activated upon contact with water. An example of the latter category includes some toilet scrubbing products that include a cleaning agent built into a head of the product that activates when contacting water. These scrubbing tools are less than ideal, however, because the cleaning head needs to be disposed of after use, leading to challenges in waste and removal for used products.

Single use dissolvable cleaning heads address some of these challenges, but introduce different challenges. For example, because dissolvable cleaning heads dissolve when exposed to water, even the portion of the cleaning head that connects to the scrubbing handle dissolves such that it can no longer securely connect to the scrubbing handle, which is why these are limited to single use.

The present disclosure is directed to overcoming these and other problems of the prior art.

SUMMARY

Embodiments of the present disclosure address and overcome one or more of the above shortcomings and drawbacks, by providing an in-toilet device for storing and shaping a moldable and dissolvable cleaning head between uses as an attachment to a scrubbing handle.

In an exemplary embodiment, a scrubbing tool system includes a handle, a moldable and dissolvable cleaning head, and a storage and molding device. The handle is for holding by a user in a cleaning operation. The handle has a projecting portion. The moldable and dissolvable cleaning head has a cavity to mate with the projecting portion to attach the cleaning head to the handle. The cleaning head is made of a moldable material that dissolves in water, and the moldable material includes a cleaning agent. The storage and molding device is movable from a storing position to a shaping position to attach the cleaning head to the handle. The storage and molding device has a base, a receiving surface, and a plurality of shaping tabs. A first gap exists between the base and the receiving surface. The plurality of shaping tabs connect the receiving surface and the base. The plurality of shaping tabs curve up from the receiving surface, thereby forming with the receiving surface a cup in which the cleaning head is received. The plurality of shaping tabs are arranged such that a respective tab gap exists between shaping tabs in the storing position.

In some embodiments, in the shaping position, the cleaning head is pushed by the handle into the receiving surface causing the shaping tabs to deflect inwardly and compress side walls of the cleaning head to conform the cavity to the projecting portion.

In some embodiments, the projecting portion has one or more flexible rings extending radially from the projecting portion. In the shaping position, material of the cleaning head is forced on either side of one or more of the one or more flexible rings to more securely attach the cleaning head to the handle.

In some embodiments, the projecting portion has a non-flexible flange connected to the projecting portion at a location proximate a proximal end of the projecting portion. In the shaping position, material of the cleaning head is forced around a lower surface area and an outer perimeter of the non-flexible flange to reduce water intrusion into the cavity.

In some embodiments, the storage and molding device has an arm attached to the base. The arm has a hook to attach the storage and molding device on a rim of a toilet bowl.

In some embodiments, the storage and molding device further has a ramp connected to the receiving surface and extending towards the base and the hook such that the ramp directs flow from a flushing operation travels up the ramp and towards the cup to contact the cleaning head.

In some embodiments, each of the shaping tabs has an outer section and an inner section. The outer section has a first outer end connected to and extending upwardly from the base. The inner section has a first inner end connected to and extending upwardly from the receiving surface and a second inner end connected to a second outer end of the outer section forming a living hinge connecting the inner section to the outer section.

In some embodiments, moving the storage and molding device to the shaping position reduces sizes of the first gap and the respective tab gaps such that the receiving surface is moved closer to the base and adjacent shaping tabs are closer to each other.

In another exemplary embodiment, a storage and molding device has a base, a receiving surface, and a plurality of shaping tabs. A first gap exists between the base and the receiving surface. The plurality of shaping tabs connect the receiving surface and the base. The plurality of shaping tabs curve up from the receiving surface thereby forming with the receiving surface a cup in which a moldable and dissolvable cleaning head is received. The storage and molding device is movable from a storing position to a shaping position to attach the cleaning head to a handle. The plurality of shaping tabs arranged such that a respective tab gap exists between shaping tabs in the storing position.

In some embodiments, the storage and molding device has an arm attached to the base. The arm has a hook to attach the storage and molding device on a rim of a toilet bowl.

In some embodiments, the storage and molding device has a ramp connected to the receiving surface and extending towards the base and the hook such that the ramp directs flow from a flushing operation travels up the ramp and towards the cup to contact the cleaning head.

In some embodiments, the arm angles away from the base and forms therein an opening through which flow can travel towards the ramp.

In some embodiments, each of the shaping tabs has an outer section and an inner section. The outer section has a first outer end connected to and extending upwardly from the base. The inner section having a first inner end connected to and extending upwardly from the receiving surface and a second inner end connected to a second outer end of the outer section forming a living hinge connecting the inner section to the outer section.

In some embodiments, moving the storage and molding device to the shaping position reduces sizes of the first gap and the respective tab gaps such that the receiving surface is moved closer to the base and adjacent shaping tabs are closer to each other.

In yet another exemplary embodiment, a moldable and dissolvable cleaning head has a moldable body made of material configured to release a cleaning agent and gradually dissolve over a period of time when submerged in water. The moldable body has a back surface, a cleaning surface opposite the back surface, a side wall extending between the back surface and the cleaning surface, a cavity formed in the back surface and extending from an opening in the back surface towards the cleaning surface. The cavity has an inner diameter that can be remolded to its original inner diameter after dissolving after having been exposed to water.

In some embodiments, the cleaning head comprises up to about 5% of an oxygenated bleaching agent.

In some embodiments, the oxygenated bleaching agent comprises disodium carbonate, compound with hydrogen peroxide (2:3).

In some embodiments, the cleaning head has about 20% to about 80% of a surfactant and up to about 5% of an oxygenated bleaching agent.

In some embodiments, the surfactant comprises benzenesulfonic acid, C10-13-alkyl derivatives, sodium salts; sodium carbonate; sulfonic acids, C14-16-alkane hydroxy and C14-16-alkene, sodium salts; sulfuric acid, mono-C12-18-alkyl esters, sodium salts; or any one of the combinations thereof.

In some embodiments the cleaning head has the following substances in the following concentrations:

| Substance name | Concentration (w/w %); |
|---|---|
| benzenesulfonic acid, C10-13-alkyl derivatives, sodium salts | 15-20 |
| sodium carbonate | 10-15 |
| sulfonic acids, C14-16-alkane hydroxy and C14-16-alkene, sodium salts | 10-16 |
| sulfuric acid, mono-C12-18-alkyl esters, sodium salts | 1-5 |
| disodium carbonate, compound with hydrogen peroxide (2:3) | 0.3-0.8 |
| diphenyl ether | 0.04-0.20 |
| 4-methylanisole | 0.02-0.1 |

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional features and advantages of the disclosed technology will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Figure 1A:
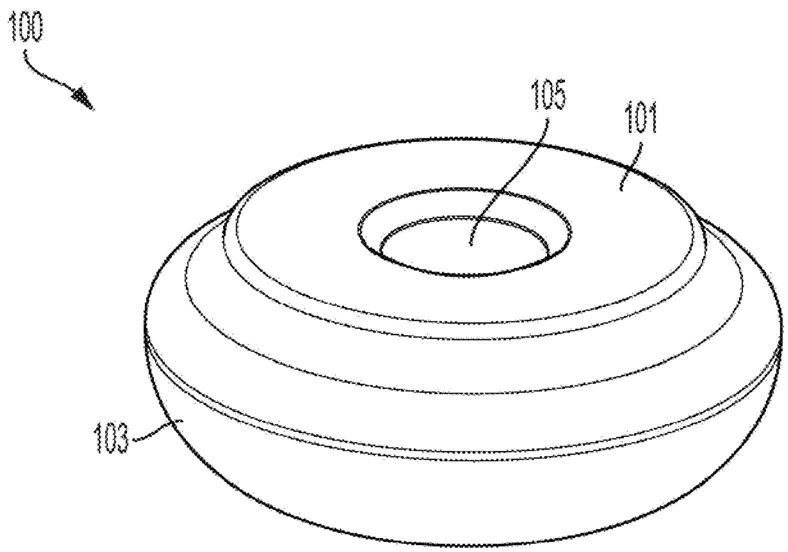
FIGS. 1A and 1B are various views of a moldable and dissolvable cleaning head, in accordance with an embodiment of the disclosure.

Disclosed herein is scrubbing tool system having a storage and molding device, and a moldable and dissolvable cleaning head. The storage and molding device is a storage and molding device can be an in-toilet device for use with the moldable, and dissolvable cleaning head. The storage and molding device is dual function: it can store a cleaning head in a toilet bowl between uses as an attachment to a handle and it can mold the cleaning head, thereby attaching it to the handle, as described in further detail below. Because the cleaning head is moldable, it is reusable, meaning it can be used for multiple cleanings of, for example, a toilet bowl. The storage and molding device has an elevated receiving surface surrounded by shaping tabs. To use the storage and molding device, a cleaning head is placed on the receiving surface cavity-side-out, a projecting portion of a scrubbing handle is placed into the cavity, and a user pushes the scrubbing handle towards the cleaning head to force the cleaning head towards the toilet bowl wall using the handle. As the cleaning head is forced towards the toilet bowl wall, it pushes the elevated receiving surface towards the toilet bowl wall. As the elevated receiving surface is forced towards the toilet bowl wall, the shaping tabs that are connected to the elevated receiving surface and that surround the cleaning head are forced inward to contact and force the material of the cleaning head inward towards the center cavity. In doing so, the inner surface of the cavity is compressed inward and conforms the inner surface of the cavity to the outer surface of the projecting portion of the handle. This action securely connects the cleaning head to the scrubbing handle for a duration suitable to perform a cleaning operation such as, for example, scrubbing a toilet bowl.

By using this storage and molding device and a moldable and dissolvable cleaning head, the cleaning head no longer needs to be discarded after a single use, or limited to use as an in-water toilet bowl cleaner when the diameter of the cleaning head cavity grows so large as it dissolves that the cleaning head can no longer be securely connected to the scrubbing handle. Instead, the cleaning head can be remolded and reshaped, allowing the cleaning head to be reused as an attachment to a scrubbing handle again and again until eventually there is not enough material left to perform an effective scrubbing operation. Once the cleaning head no longer has sufficient material remaining for it to be remolded to connect to the handle, the remaining material of the cleaning head may be discarded or used as an in-water toilet bowl cleaner, for example, in the bowl or tank of the toilet. And between uses, it may be released from the handle into the storage and molding device so it helps clean and disinfect the toilet bowl during flushes. As such, the moldable and dissolvable cleaning head is multi-functional, and may be used to: clean the toilet bowl during flushes while it is being stored in the storage and molding device; clean the toilet bowl when it is connected to the scrubbing handle; and/or clean the bowl or tank once it is no longer suitable to be remolded by discarding it from the scrubbing handle into the bowl or tank.

Ideally, the cleaning head is only exposed to moisture and water when it is actively used in a cleaning operation (whether that be, for example, a scrubbing operation when attached to a handle or a cleaning operation when stored in a storage and molding device during a flushing operation), and only those areas of the cleaning head engaged in that cleaning operation are directly exposed to water. For example, when the cleaning head is stored in the storage and molding device, the cavity is advantageously facing outward from the inner surface of the bowl where water runs during a flush of the toilet, hence the cleaning surface of the cleaning head is more directly in contact with the water than is the back surface and cavity.

In some embodiments, the system described herein may include additional features for reducing or preventing water from entering the cavity, thus slowing down any dissolving of the cavity in between scrubbing operations. For example, in some embodiments, the scrubbing handle's first connector has one or more flexible rings and/or a flange, as described in greater detail below.

Figure 1B:
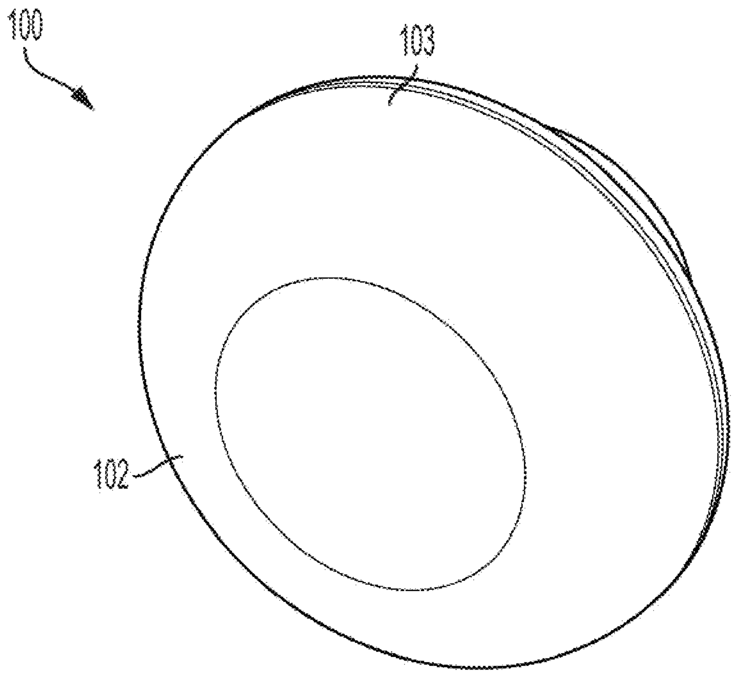

Turning now to the Figures, FIGS. 1A and 1B are various views of a moldable and dissolvable cleaning head 100, in accordance with an embodiment of the disclosure. In some embodiments, the cleaning head 100 is substantially disc-shaped with a back surface 101, a cleaning surface 102 opposite the back surface, and a side wall 103 extending between the back surface 101 and the cleaning surface 102. The cleaning head 100 also has a cavity 105 formed in the back surface 101 that can receive a projecting portion 210 of a scrubbing handle 200 and thereby connect the cleaning head 100 to the scrubbing handle 200. The entrance to the cavity 105 is an opening formed in the back surface 101 of the cleaning head 100, as shown in FIG. 1A.

As described above, the cleaning head 100 can be moldable, meaning that the shape of the cleaning head can be changed by the application of force and/or pressure on the cleaning head. In order for the cleaning head 100 to be moldable, in some embodiments, the cleaning head 100 can be made of a soft dough-like mass that is extrudable and moldable.

Figure 3:
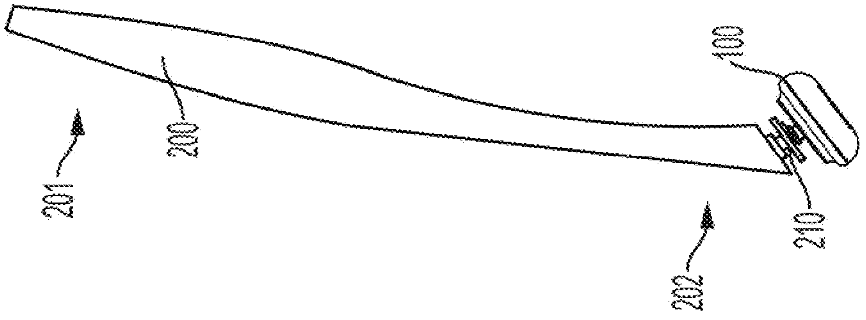
FIG. 3 shows a cleaning head connected to a scrubbing handle, according to an embodiment of the present disclosure.
Figure 2:
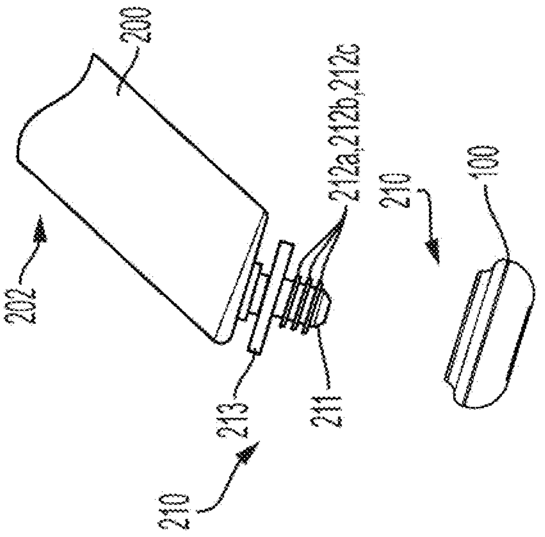
FIG. 2 is a close-up of the tablet end of a scrubbing handle prior to connection to a cleaning head, according to an embodiment of the present disclosure.

FIG. 2 is a close-up of the tablet end 202 of a scrubbing handle 200 prior to connection to a cleaning head 100, and FIG. 3 shows a cleaning head 100 connected to a scrubbing handle 200, each according to embodiments of the present disclosure. The scrubbing handle 200 can have a gripping end 201 and a tablet end 202. The tablet end 202 can have a first connector to mate with a second connector of the cleaning head 100. In some embodiments the first connector comprises a projecting portion 210 to insert into the cavity 105 of the cleaning head 100. In some embodiments, the projecting portion 210 can have a main body 211 (which, in some embodiments, is cylindrical, but may take the form of any other suitable shape).

In another embodiment, the projecting portion 210 may include one or more flexible rings 212 around the main body. The flexible rings 212 can have an outer diameter that is equal to or greater than the inner diameter of a new (i.e., undissolved) cleaning head 100's cavity 105 such that the cleaning head 100 can be connected to the scrubbing handle 200 via a friction fit between the flexible rings 212 and the inner surface of the cavity 105. Because of the flexible rings 212 and the relatively short main body, the cleaning head 100 and the scrubbing handle 200 can move with respect to each other. While the above description describes a male-female, scrubbing handle-cleaning head connection, the subject matter disclosed herein is not so limited, and other connection types are possible.

In another embodiment, the projecting portion 210 may include a flange 213, that may or may not be rigid, opposite the distal end of the main body. On the projecting portion 210, the flange 213 may be located such that it is separated from the distal end of the projecting portion 210 by the flexible rings 212. In other words, the projection position 210 can have a distal end, then one or more flexible rings 212, then a flange 213. In some embodiments, the flange 213 can have a larger diameter than the opening of the cavity to allow the bottom of the flange 213 to be flush with the back surface of the cleaning head (an embodiment of which is shown in FIG. 3). This may help prevent water from flowing into the opening of the cavity. In some embodiments, the flange 213 can have the same or a slightly smaller diameter than the opening of the cavity, and the first connector can be sized such that the flange 213 is inside the cavity, with the top surface of the flange 213 flush with the back surface of the cleaning head. In some embodiments, this may help over-flexing of the flexible rings 212 that could affect the water-tight seals formed thereby. In some embodiments, the material of a moldable and dissolvable cleaning head can be forced around a lower surface area and/or an outer perimeter of the flange to reduce water intrusion into the cavity.

With the cleaning head 100 connected to the scrubbing handle 200 the cleaning head 100 can be used in a scrubbing operation, e.g., for scrubbing a toilet bowl. To effectuate this purpose, in some embodiments, the cleaning head 100 is comprised entirely of a material configured to dissolve in water and that comprises a cleaning agent.

The cleaning head 100 may dissolve or disassociate gradually over time. In some embodiments, the cleaning head 100 dissolves in water over a longer period of time than some conventional single-use dissolvable cleaning heads, allowing for multiple scrubbing operations. In some embodiments, the cleaning head to dissolve in twenty hours when submerged in one gallon of water. In at least some embodiments, the materials that make up the cleaning head

100 are safe for flushing when appropriately sized due to dissolution of the cleaning head 100. In some embodiments, the cleaning head 100 is designed to be used as an in-bowl toilet cleaning tablet after being used on the scrubbing handle 200, either in an in-bowl holder or in the toilet water. For example, in some embodiments, after the cleaning head 100 is connected to a scrubbing handle and used to clean the bowl of the toilet, the user releases the cleaning head 100 into the water of the toilet bowl or into a holder in the toilet bowl. When released into a holder in the toilet bowl, the cleaning head 100 would then dissolve slowly over time and release cleaning solution into the tank water during flushes. As the cleaning solution circulates around the bowl with each flush, the solution acts to further clean and/or deodorize the bowl. Additionally or alternatively, in some embodiments, the other use can be depositing the cleaning head 100 in the back toilet tank's water where it would then dissolve over time and release cleaning solution into the tank water.

In some embodiments, the cleaning head 100 can be multi-functional, meaning that it can be used for two or more of the following purposes: as an attachment to a handle 200 for use in a scrubbing operation, to clean a toilet bowl while stored in an in-toilet bowl holder during flushes, and to clean a toilet when disposed in bowl or tank after useful life of cleaning head. As used here, "useful life" means that the cleaning head 100 can be remolded to securely connect to handle 200. In some embodiments, in between uses attached to a handle 200, the cleaning head 100 can be stored in a storage and molding device in a toilet bowl, elevated above the toilet bowl water. Each time the toilet flushes, the cleaning head 100 within the storage and molding device can provide cleaning action as water from a flushing operation flows over the cleaning head and then around the toilet bowl. In some embodiments, the cleaning head 100 is iteratively attached to a handle 200 for use in a scrubbing operation and stored in an in-toilet holder. At the end of the cleaning head's 100 useful life, the cleaning head 100 may be deposited into the toilet bowl water or the back toilet tank to clean and disinfect the bowl and/or tank.

In some embodiments, the cleaning head 100 can be reusable or multi-use, meaning that it can be used as an attachment to a handle 200 for use in a scrubbing operation multiple times before the end of its useful life. In some embodiments, the reusable or multi-use nature of the cleaning head 100 is a result of the cleaning head 100 being re-moldable. In some embodiments, to support the reusable nature of the cleaning head, instead of a pressed powder-based tablet, the cleaning head 100 material comprises a water-soluble, gel-like solid.

In terms of how many times the cleaning head described herein can be used as an attachment to a handle during a cleaning operation, in some embodiments, the cleaning head can be used more than one time. In some embodiments, the cleaning head can be used more than five times. In some embodiments, the cleaning head can be used more than ten times. In some embodiments, the cleaning head can be used more than twenty times.

The number of times the cleaning head can be used as a scrubbing head when stored in the toilet bowl between uses can vary based on the user and environment. For an extreme example, one user may flush that toilet every hour during the day and use the wand once a week while another only flushes their toilet and uses the wand once every other week. This will potentially change the use rate by an order of magnitude. In addition, the cleaning head's material's hardness and durability are heavily dependent on its exposure to water so if one user lets the head dry out for a week between uses, it will last longer than a user who only lets it dry out for a couple hours or a day between uses. In terms of how long a user can expect to be able to use a cleaning head both as an attachment to a handle and an in-bowl cleaner in between uses can vary based on user behavior. For example, a couple in a one-bathroom apartment will need to clean and flush that single toilet significantly more frequently than would be done in the guest bathroom of a suburban home. The range could be anywhere from a day to many weeks. For example, the useful life of a cleaning head for a super frequent user may be one week or approximately three to four uses, while the useful life of a cleaning head for a super infrequent user may be many months or approximately ten uses.

The cleaning head 100 includes one or more of a cleaning agent, a dissolvable/disintegrable scrubbing element, binder, filler, colorant, fragrance, preservative or other dissolvable, dissociative, or disintegrable material. The cleaning agent may, for example, include one or more of a surfactant, a soap, a detergent, a bactericidal agent, a bleaching agent (including, for example, oxygenated bleach), a chelant, a salt, a coloring agent, fragrances, and preservatives. In some embodiments, a detergent is a surfactant or a mixture of surfactants with cleansing properties when in dilute solutions.

The cleaning head 100 may include one or more surfactants comprising a detersive surfactant selected from anionic surfactants, nonionic surfactants, cationic surfactants, zwitterionic surfactants, amphoteric surfactants, ampholytic surfactants, and mixtures thereof. In some embodiments, the cleaning head comprises about 20% to about 80% of a surfactant. In some embodiments, the cleaning head comprises about 30% to about 60% of a surfactant. In some embodiments, the cleaning head comprises about 36% to about 56% of a surfactant. Those of ordinary skill in the art will understand that a detersive surfactant encompasses any surfactant or mixture of surfactants that provide cleaning, stain removing, or laundering benefits. In some embodiments, the anionic surfactant comprises sulfate, sulfonate, and phosphate, carboxylate acids, derivatives, or salts. In some embodiments, the anionic surfactant comprises ammonium lauryl sulfate, sodium lauryl sulfate (i.e., sulfuric acid, mono-C12-18-alkyl esters, sodium salts, sodium dodecyl sulfate, SLS, or SDS), the related alkyl-ether sulfates sodium laureth sulfate (i.e., sodium lauryl ether sulfate or SLES), sodium olefin sulfonate (i.e., sulfonic acids, C14-16-alkane hydroxy and C14-16-alkene, sodium salts), sodium myreth sulfate, alkylbenzene sulfonates (e.g., benzenesulfonic acid, C10-13-alkyl derivs., sodium salts, or dodecylbenzene sulfonate), docusate (dioctyl sodium sulfosuccinate), perfluorooctanesulfonate (PFOS), perfluorobutanesulfonate, alkyl-aryl ether phosphates, alkyl ether phosphates, sodium carbonate, sodium stearate, sodium lauroyl sarcosinate, and carboxylate-based fluorosurfactants (such as perfluorononanoate and perfluorooctanoate (PFOA or PFO)). In some embodiments, the surfactant comprises:

- benzenesulfonic acid, C10-13-alkyl derivatives, sodium salts;
- sodium carbonate;
- sulfonic acids, C14-16-alkane hydroxy and C14-16-alkene, sodium salts;
- sulfuric acid, mono-C12-18-alkyl esters, sodium salts; or any one of the combinations thereof.

In some embodiments, the surfactant comprises:

- benzenesulfonic acid, C10-13-alkyl derivatives, sodium salts;
- sodium carbonate;

sulfonic acids, C14-16-alkane hydroxy and C14-16-alkene, sodium salts; and sulfuric acid, mono-C12-18-alkyl esters, sodium salts.

The cleaning head 100 may include one or more bleaching agents comprising chlorine bleach, oxygenated bleach, or both. In some embodiments, the cleaning head 100 comprises one or more oxygenated bleaches. In some embodiments, the cleaning head 100 comprises up to about 5% of an oxygenated bleach. In some embodiments, the cleaning head 100 comprises about 0.1% to about 5.0% of an oxygenated bleach. In some embodiments, the cleaning head 100 comprises about 0.1% to about 3.0% of an oxygenated bleach. In some embodiments, the cleaning head 100 comprises about 0.1% to about 1.0% of an oxygenated bleach.

The oxygenated bleach is advantageous over chlorine bleach: oxygenated bleach is color-safe, less corrosive, environmentally friendly, less toxic, and effective at lower temperature. In some embodiments, the term "oxygenated bleach," "oxygen bleach," and "non-chlorine bleach" are used interchangeably. In some embodiments, the oxygenated bleach comprises sodium percarbonate, hydrogen peroxide, or sodium perborate. In some embodiments, the oxygenated bleach comprises sodium percarbonate. The terms "sodium percarbonate" and "disodium carbonate, compound with hydrogen peroxide (2:3)" refer to the same compound and are used interchangeably.

The cleaning head 100 may include one or more fragrances, such as diphenyl ether, 4-methylanisole, or both. In some embodiments, the cleaning head 100 comprises up to about 1.5% of a fragrance. In some embodiments, the cleaning head 100 comprises up to about 0.01% to about 1.5% of a fragrance.

In some embodiments, the cleaning head 100 comprises benzenesulfonic acid, C10-13-alkyl derivatives, sodium salts, sodium carbonate, sulfonic acids, C14-16-alkane hydroxy and C14-16-alkene, sodium salts, sulfuric acid, mono-C12-18-alkyl esters, sodium salts, disodium carbonate, compound with hydrogen peroxide (2:3), diphenyl ether, and 4-methylanisole.

In some embodiments, the cleaning head 100 comprises:

| Substance name | Concentration (w/w %); |
|---|---|
| benzenesulfonic acid, C10-13-alkyl derivs., | 15-20 |
| sodium salts sodium carbonate | 10-15 |
| sulfonic acids, C14-16-alkane hydroxy and C14-16-alkene, sodium salts | 10-16 |
| sulfuric acid, mono-C12-18-alkyl esters, sodium salts | 1-5 |
| disodium carbonate, compound with hydrogen peroxide (2:3) | 0.3-0.8 |
| diphenyl ether | 0.04-0.20 |
| 4-methylanisole | 0.02-0.1 |

The scrubbing element may be any suitable material provided it is dissolvable, dissociative, and/or disintegratable in water. For example, and not by way of limitation, the scrubbing agent can include cellulosic material (e.g. paper), solid cleaning agents (e.g. powder, granules, pellets, etc.) or combinations thereof. Through choice of material, the rate of dissolution, disassociation, and/or disintegration can be controlled to balance the time needed to clean and the time needed to reach a flushable or other desirable stated, and to allow complete dissolution, disassociation, and/or disintegration.

In some embodiments, the cleaning head 100 can comprise materials that dissolve effervescently while simultaneously cleaning and giving off a pleasant colorant and/or fragrance. Some embodiments may include effervescent agents such as citric acid. Again though choice of materials the amount and timing of the effervescence may be controlled.

In some embodiments, the cleaning head 100 is made of a homogeneous mixture. In some embodiments, one half of the cleaning head 100 is one color (e.g., white) and the other half of the cleaning head 100 is another color (e.g., blue). In such embodiments, each half of the cleaning head has the same homogenous composition, with the only difference between its color and the ingredients required to achieve its color (e.g., dye).

Because the cleaning head 100 is dissolvable, the area of the cleaning head 100 surrounding and forming the boundaries of the cavity 105 will dissolve as they are exposed to moisture and water. Previously solutions, such as the Scrubbing Tool Having a Dissolvable Cleaning Head disclosed in U.S. Pat. No. 11,779,171, which is hereby incorporated by reference herein in its entirety, have features designed to protect the cavity 105 from water intrusion into the cavity 105. However, such a solution does not provide complete adequate protection of the cleaning head 100 when it is stored in a toilet bowl to release cleaning solution into the toilet bowl water to further clean the bowl between scrubbing operations. Further, it may be less expensive to manufacture a scrubbing handle 200 without features to prevent water intrusion into the cleaning head's 100 cavity 105. Therefore, the present disclosure discloses a cleaning head 100 that, in addition to the attributes discussed above, is moldable, and a storage and molding device that reshapes the cleaning head 100 each time the cleaning head 100 is connected to the scrubbing handle 200 to account for and rectify any dissolving of the cavity in the cleaning head 100.

A storage and molding device remolds the cleaning head 100 by forcing the materials of the cleaning head 100 inwardly around the projecting portion 210 of a scrubbing handle 200 to form the inner surface of the cavity 105 to the outer surface of the projecting portion 210 and thereby connect the cleaning head 100 to the scrubbing handle 200. Because the storage and molding device can reshape the cavity 105 in this way, if the cavity's 105 diameter grows too large, the storage and molding device will force the cleaning head 100 inwardly molding it about the projecting portion 210 until the cleaning head 100 connects to it.

Multiple embodiments of a storage and molding device are disclosed herein, including: a single-piece embodiment and a multi-piece embodiment. The single-piece embodiment will be described first with respect to FIGS. 4A-7C, and the multi-piece embodiment will be described with respect to FIGS. 8A-10E.

Turning now to the first embodiment, FIGS. 4A-4D are various views of a single-piece storage and molding device 300, according to an embodiment of the disclosure. As the name suggests, the single-piece storage and molding device 300 can be a single piece. It can also be formed from one material, for example, by additive manufacturing or injection molding. As will be described in further detail below, the storage and molding device 300 can be selectively moved from a storing position in which a cleaning head 100 can easily be deposited into or retrieved from the storage and molding device 300 and a shaping position in which certain features of the storage and molding device 300 are forced inwardly to mold a cleaning head 100 therein.

The storage and molding device 300 can have a base 310, a receiving surface 330, and a plurality of shaping tabs 320 connecting the base 310 to the receiving surface 330. In some embodiments, the storage and molding device 300 can also have an arm 400.

The base 310 has a back surface 311 that, when installed in a toilet bowl, contacts the toilet bowl wall. While the storage and molding device 300 in FIGS. 4A-4D shows a ring-shaped base 310 having an inner diameter and an outer diameter, the base 310 can be any geometric shape and can be one solid piece without an inner perimeter.

The receiving surface 330 can be concentric with and elevated from the base 310. The receiving surface 330 can have a top surface 331 and a bottom surface 332. When a cleaning head 100 is placed in the storage and molding device 300, the scrubbing face 502 of the cleaning head 100 will be in contact with the top surface 331 of the receiving surface 330. While the storage and molding device 300 in FIGS. 4A-4D show a circular receiving surface 330, the receiving surface 330 can be any geometric shape.

In the storing position, the bottom surface 332 of receiving surface 330 is not co-planar with the back surface 311 of the base 310. Instead, there is a gap 315 between them, the receiving surface 330 is elevated from the back surface 311 of the base 310. Because of this, when installed in a toilet bowl, the back surface 311 of the base 310 will contact the toilet bowl wall, but the bottom surface 332 of the receiving surface 330 will not.

Because the cleaning head 100 is elevated above the toilet bowl wall in the receiving surface 330, much of the water flowing down the toilet bowl wall during a flushing operation may flow beneath the receiving surface 330 and not contact the cleaning head 100 on the receiving surface 330. As one of ordinary skill in the art will appreciate, increasing the amount of water that contacts the cleaning head 100 can increase the cleaning action during a flushing operation. Therefore, in some embodiments and as shown in FIGS. 4A-4D, the storage and molding device 300 has a water ramp 335 to help direct water flow from the top of the toilet bowl to the top of the cleaning head 100 in the storage and molding device 300. The water ramp 335 has a first end connected to the receiving surface 330 and a second fee end configured to interface with the toilet bowl wall when the storage and molding device 300 is installed in a toilet bowl. The water ramp 335 is angled towards the base 310 and is aligned with the arm 400 such that, when installed, the water ramp 335 is at the top of the receiving surface 330. Thus, when water flows down from the toilet bowl during a flushing operation, at least some water flow will travel up the water ramp 335 to the cleaning head 100 on the receiving surface 330. To further increase the amount of water that contacts the cleaning head 100, in some embodiments, the area where the arm and the base meet 350 is angled and forms an opening 355 through which water can flow. As shown and described, the water ramp 335 can direct the flow of water from a flushing operation onto the side wall 103 of the cleaning head 100 where it will then flow either along the side wall 103 and/or down the cleaning head 100 along the cleaning surface 102 In some embodiments, this reduces the water flow to the back surface 101 of the cleaning head 100, where the cavity 105 is.

As mentioned above, the shaping tabs 320 connect the base 310 and the receiving surface 330. In some embodiments, the shaping tabs 320 can be arranged around the outer perimeter of the receiving surface 330 and the inner perimeter of the base 310. The shaping tabs 320 can also be arranged such that, in the storing position, a gap 325 exists between each adjacent shaping tab 320. In some embodiments, the shaping tabs curve up from the receiving surface thereby forming with the receiving surface a cup in which the cleaning head can be received. In some embodiments, shaping tabs 320 are evenly spaced along the outer perimeter of the receiving surface 330 such that each gap 325 between neighboring shaping tabs 320 is the same size. However, the subject matter disclosed herein is not so limited. Instead, as one of ordinary skill in the art will appreciate, the gaps 325 between shaping tabs 320 may be a combination of the same or different sizes, with some shaping tabs 320 closer together and others farther apart. In other embodiments, such as the one illustrated in FIGS. 4A-4D, all but one of the gaps between the shaping tabs 320 are the same size, but one **325*f*** is larger.

Each shaping tab 320 has an outer section 321 and an inner section 323. The outer section 321 is connected to the base 310 and the inner section 323 is connected to the receiving surface 330. The outer section 321 and inner section 323 are connected to each other via a living hinge 322. As one of ordinary skill in the art appreciates, a living hinge is a thin piece of material that connects to rigid bodies and can be made out of the same material as the rigid bodies. Because the living hinge is thinner than the rigid bodies it connects, the rigid bodies can bend along the living hinge. While a living hinge is described herein, one of ordinary skill in the art will appreciate that other mechanical features that allow the outer section 321 and inner section 323 to bend with respect to one another are possible.

In some embodiments, the outer sections 321 have a linear cross-section and the inner sections 323 have a curved cross-section. Embodiments with a circular receiving surface 330 and curved inner sections 323 will shape a cleaning head 100 within into a substantially disc-like shaped tablet, such as the one shown in FIGS. 1A and 1B. However, the subject matter herein is not so limited. As one of ordinary skill in the art will appreciate, the geometry of the receiving surface 330 and shaping tabs 320 can be designed to mold many different shapes of cleaning heads.

Figure 5A:
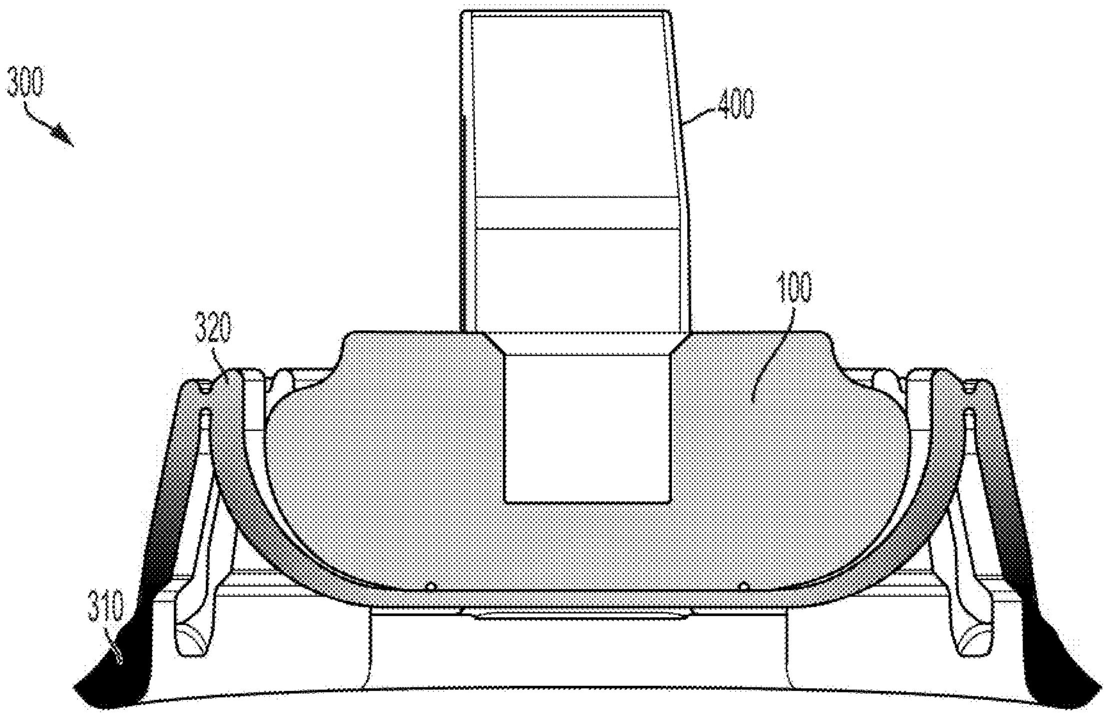
FIGS. 5A and 5B are cross-sectional views of a single-piece storage and molding device in its storing position and shaping position, respectively, according to an embodiment of the disclosure.
Figure 5B:
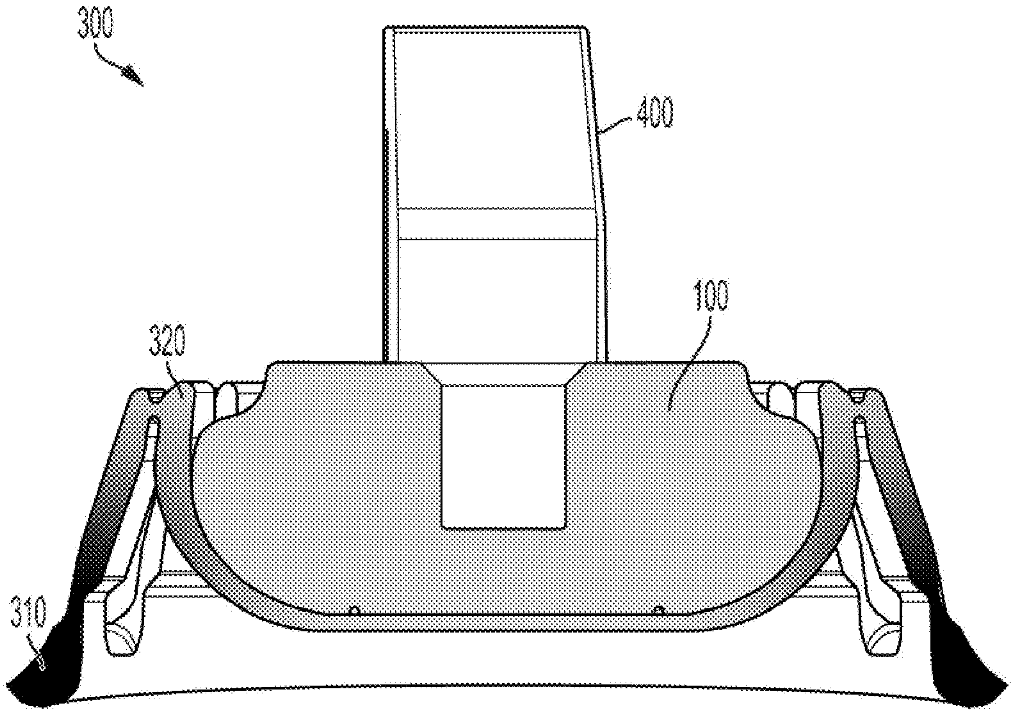
Figure 6C:
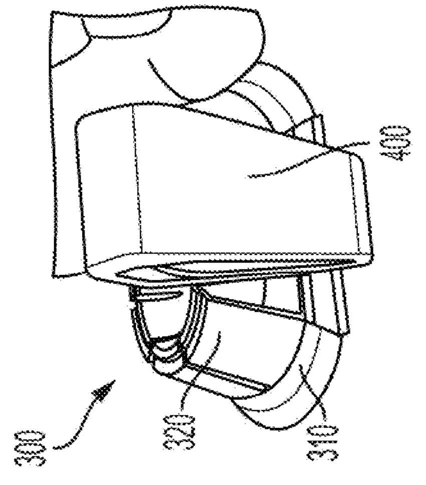
FIGS. 6A-6C illustrate a single-piece storage and molding device being moved from its storing position to its shaping position, according to an embodiment of the disclosure.
Figure 6B:
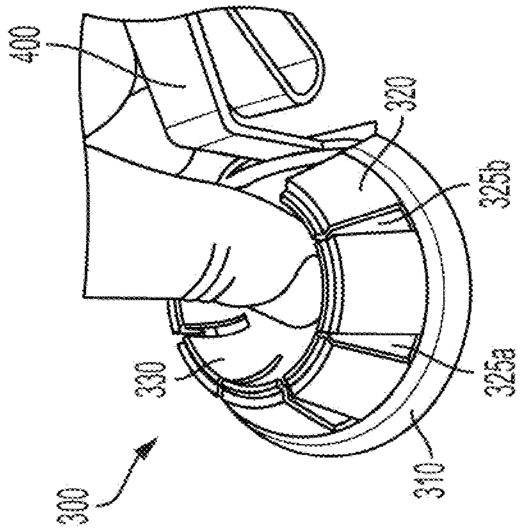
Figure 6A:
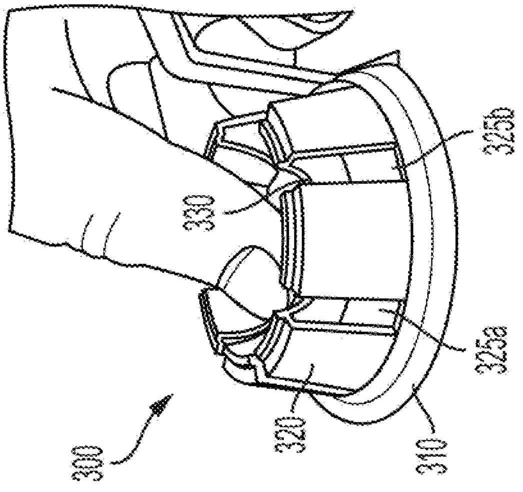

FIGS. 5A and 5B are cross-sectional views of a single-piece storage and molding device 300 in its storing position and shaping position, respectively, and FIGS. 6A-6C illustrate a single-piece storage and molding device 300 being moved from its storing position to its shaping position, each according to an embodiment of the disclosure. In the storing position (FIGS. 5A and 6A), the receiving surface 330 is elevated from the base 310 and a gap 325 exists between each adjacent shaping tab 320. In its storing position the shaping tabs 320 are not forced inwardly around the cleaning head 100. Instead, they are "open" such that a cleaning head 100 can easily be placed in or retrieved from the storage and molding device 300 without interference from the shaping tabs 320.

In the shaping position (FIGS. 5B, 6B, and 6C), the receiving surface 330 is pushed towards the base 310, which reduces the gap 315 between the receiving surface 330 and the base 310, and the shaping tabs 320 are forced inwardly around a cleaning head 100 within, which reduces the gaps 325 between neighboring shaping tabs 320. If a projecting portion 210 of a scrubbing handle 200 is within the cleaning head's 100 cavity 105 when the storage and molding device 300 is in the shaping position, the shaping tabs 320 will force the cleaning head material inwardly causing the cavity 505 of the cleaning head 100 to push up against, and conform its inner surface to, the outer surface area of the projecting portion 210 of the scrubbing handle 200, thereby reducing the cavity's 105 inner diameter and connecting the cleaning head 100 to the scrubbing handle 200. In some embodiments, the receiving surface 330 can be pressed down until its bottom surface 332 contacts the surface upon which the base 310 rests, which in some cases is the toilet bowl wall.

Because the inner surface area of the cavity 105 can be formed to the outer surface of the scrubbing handle 200, the flexible rings 212 are not required to connect the cleaning head 100 to the scrubbing handle 200, and a scrubbing handle 200 with a projecting portion 210 having only a main body can be used. However, in some embodiments, the projecting portion 210 has a protrusion or raised surface, like flexible rings, along its length to help secure the cleaning head 100 to it. The protrusion or raised surface can be any shape, including, for example and not limited to, an arrow, a circle, a crescent, a cross, an ellipse, a heart, a heptagon, a hexagon, a kite, a nonagon, an octagon, an oval, a parallelogram, a pentagon, a pie, a rectangle, a rhombus, a ring, a square, a star, a trapezium, a trapezoid, a triangle, a cone, a cube, a cuboid, a cylinder, a pyramid, a sphere, and a torus. To provide a specific example, in some embodiments, the scrubbing handle's 200 projecting portion 210 has one or more rings about its main body 211, and some of the cleaning material will be forced on either side of the rings. In this way, the cleaning head 100 can be even more securely connected to the scrubbing handle 200 than it would have been with simply a friction fit between a cylindrical cavity 105 of a cleaning head 100 and rings of a scrubbing handle's 200 projecting portion 210. The rings may be flexible or inflexible. In other embodiments, the rings do not extend continuously 360° around the main body. Instead, the rings may extend less than 360° or they may have breaks in-between them (e.g., the ring extends 30°, breaks for 30°, extends 30° again, and so on).

To provide another specific example, in some embodiments, the main body can have spikes on its outer surface area to engage with the cleaning head material. To provide yet another example, in some embodiments, instead of a main body, the projecting portion can have a larger diameter at its distal end that is inserted into the cavity 105 of the cleaning head 100 (i.e., the end opposite where it attaches to the scrubbing handle 200). To illustrate, in some embodiments, the projecting portion may "flare out" at its distal end or gradually increase in diameter along its length until it reaches its maximum diameter at or near its distal end. Although not required, in some embodiments, the projecting portion may also have one or more protrusions or raised surfaces.

In some embodiments, the material selected for the construction of the storage and molding device, either the single-piece embodiment or the multi-piece embodiment, is plastic. In some embodiments, the material selected for the construction of the storage and molding device is rubber. In some embodiments, the material selected for the construction of the storage and molding device is a synthetic material that shares certain characteristics with plastic and rubber, such as being moldable, durable, and resistant to various environmental factors. While such synthetic materials are the material of choice in some embodiments, the subject matter disclosed herein is not so limited. Instead, as one of ordinary skill in the art will appreciate, alternative materials can be used in combination with or as an alternative to said materials.

In some embodiments, the single-piece storage and molding device 300 can also have an arm 400 so the storage and molding device 300 can be installed in a toilet bowl. When installed in a toilet bowl, a cleaning head 100 within the storage and molding device 300 can provide cleaning action when the toilet flushes as water from a flushing operation flows into and out of the storage and molding device 300 both through the gaps 325, 315 between the shaping tabs 320, and the inner perimeter of the base 310, and through the opening 355 and up the water ramp 335 to the cleaning head 100 for embodiments with those features. After several flushing operations, the connection feature of the cleaning head 100, which in some embodiments is a cavity 105, may have begun to dissolve, possibly increasing the diameter of the inner surface of the cavity 105 and requiring the use of the storage and molding device 300 to reshape the inner surface of the cavity 105 such that it can connect to the scrubbing handle 200.

Figure 7A:
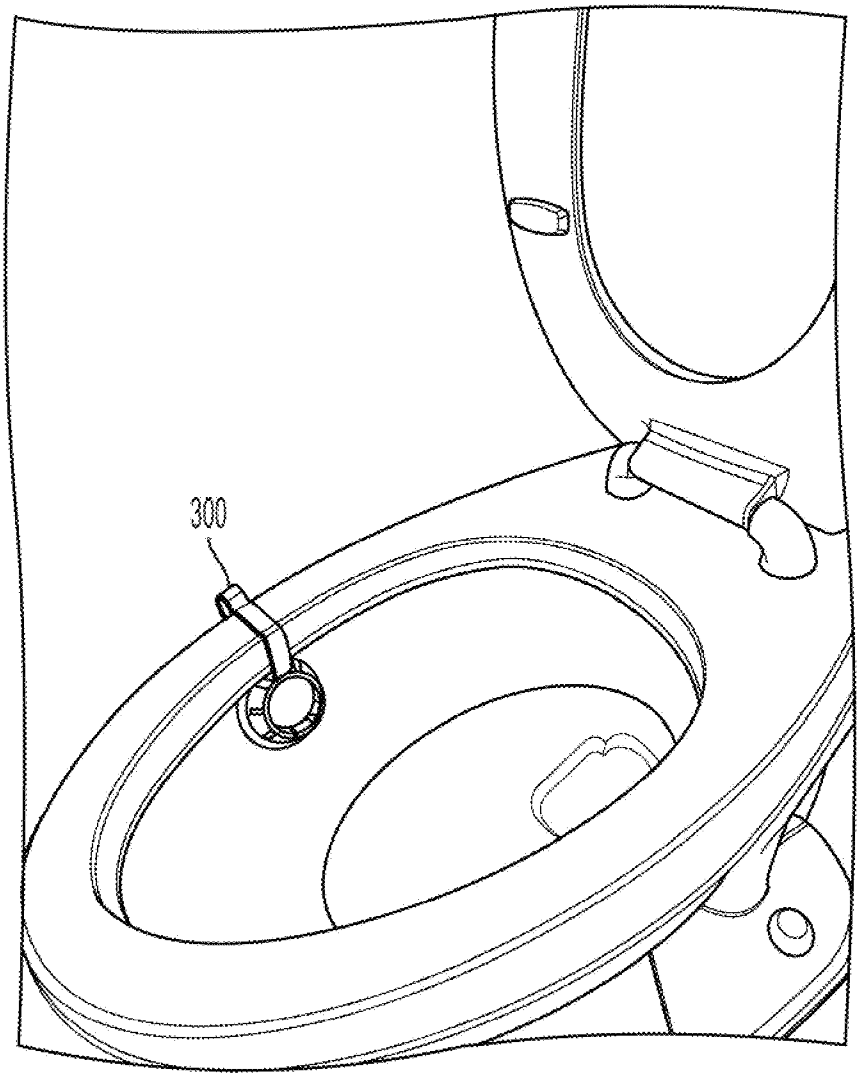
FIGS. 7A-7C show a single-piece storage and molding device installed on a toilet, according to an embodiment of the present disclosure.
Figure 7B:
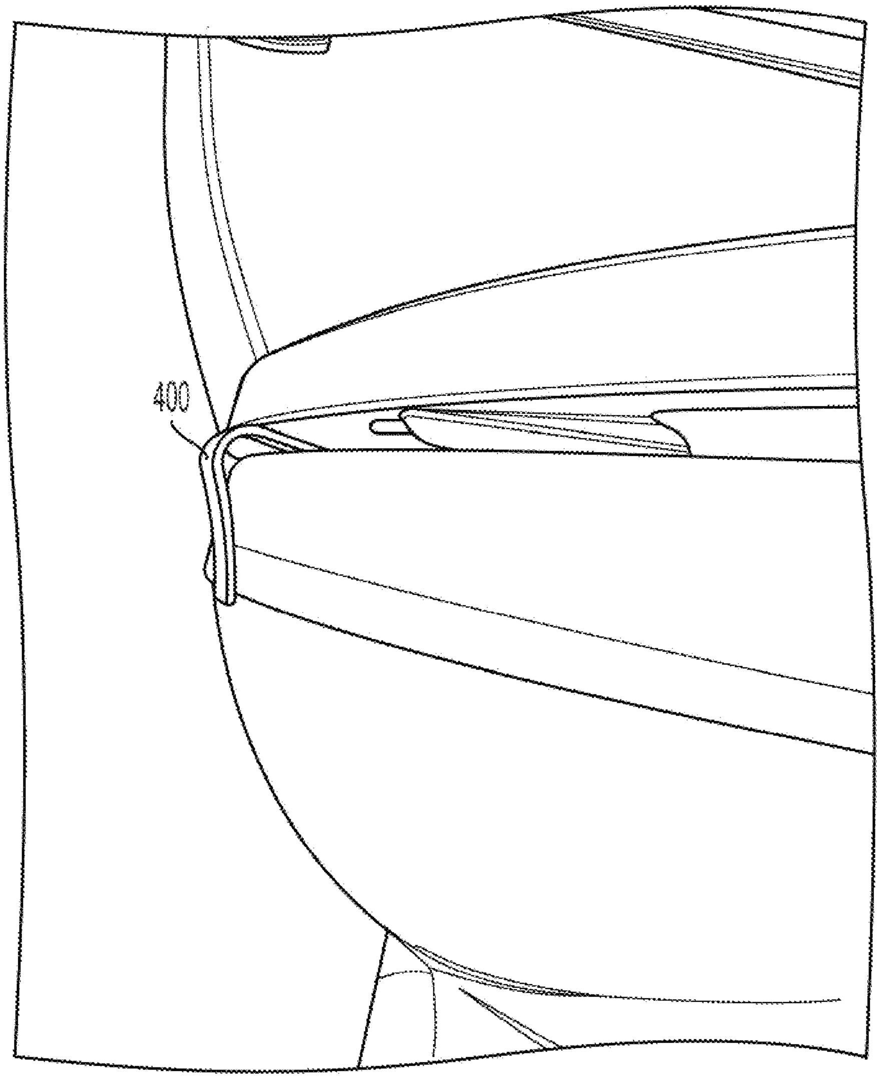
Figure 7C:
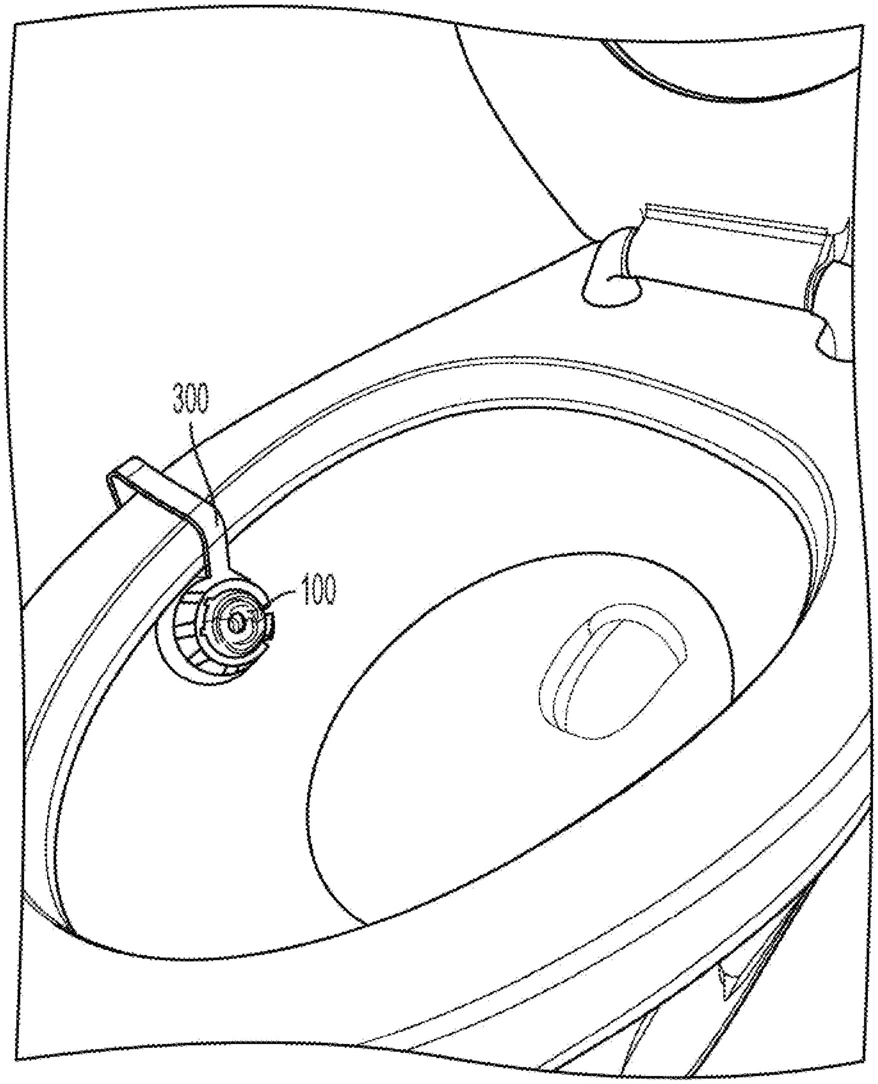
Figure 8A:
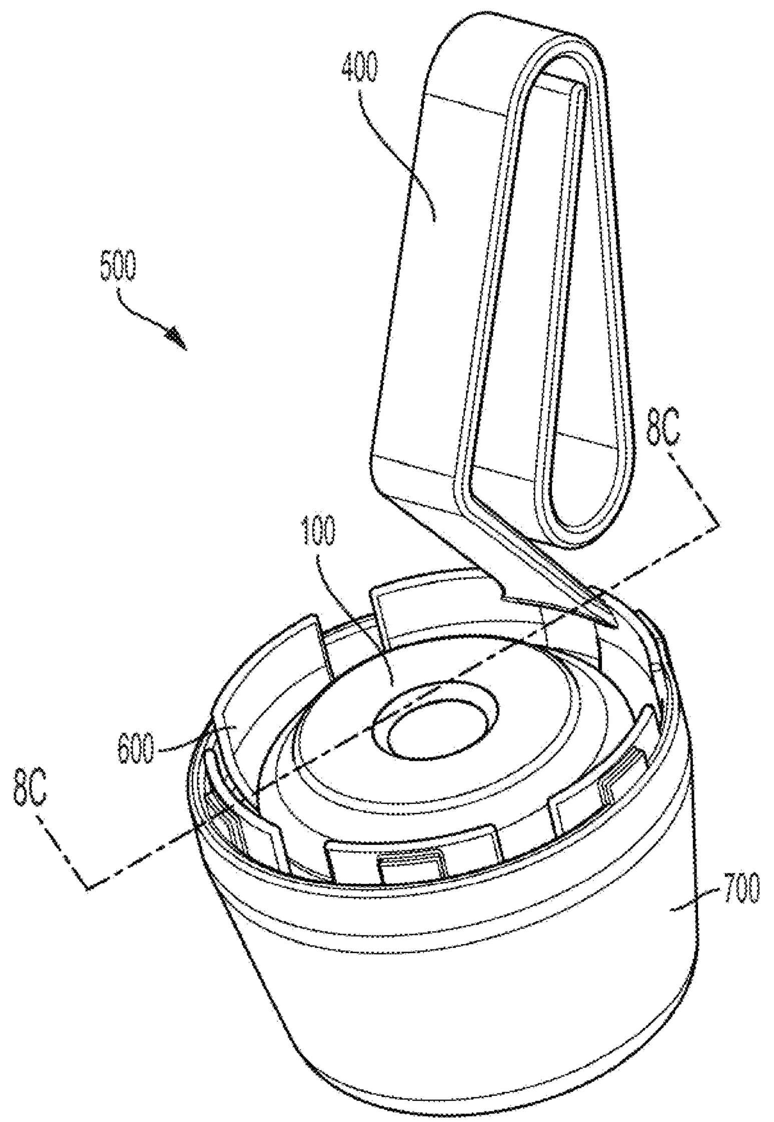
FIGS. 8A-8E are various views of a multi-piece storage and molding device, according to embodiments of the disclosure.
Figure 8B:
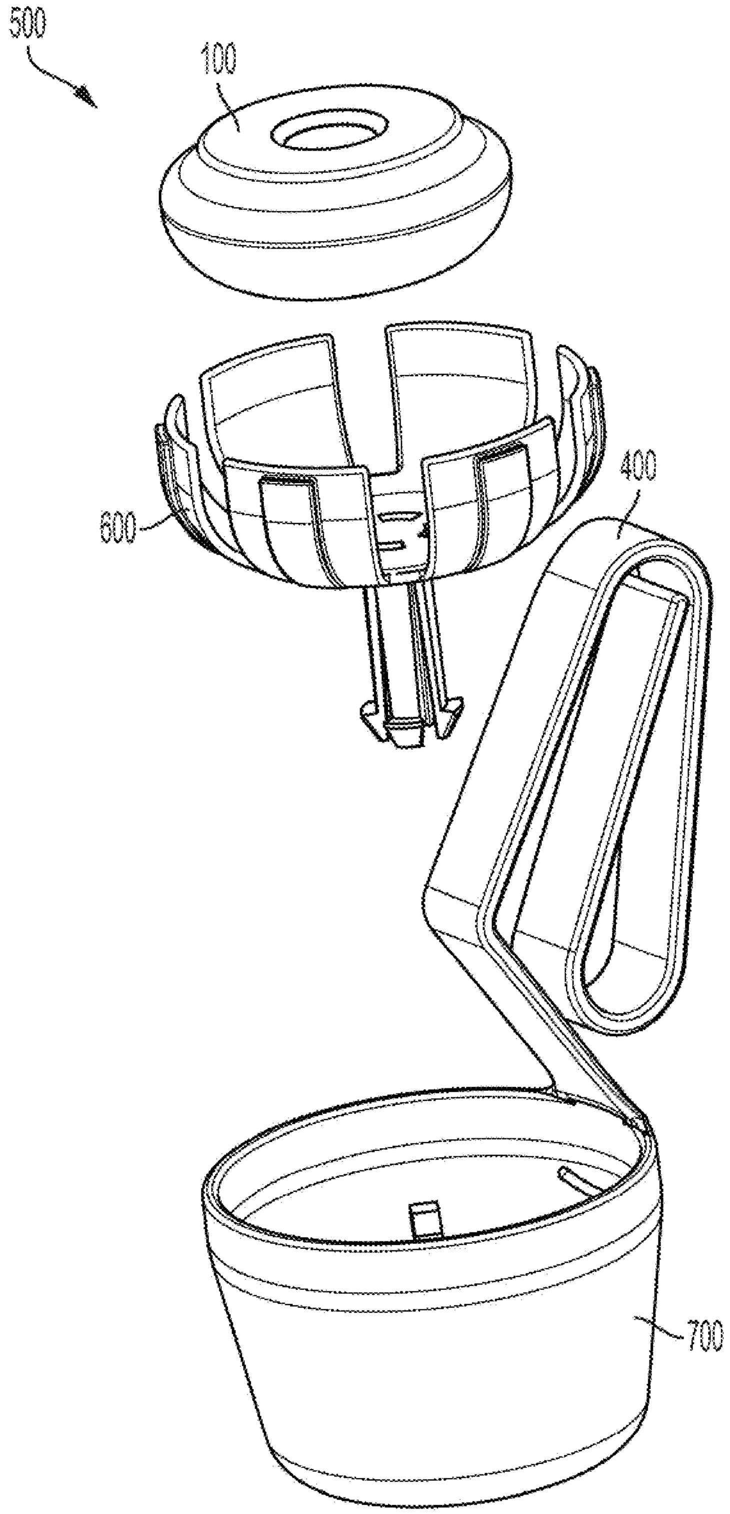
Figure 8C:
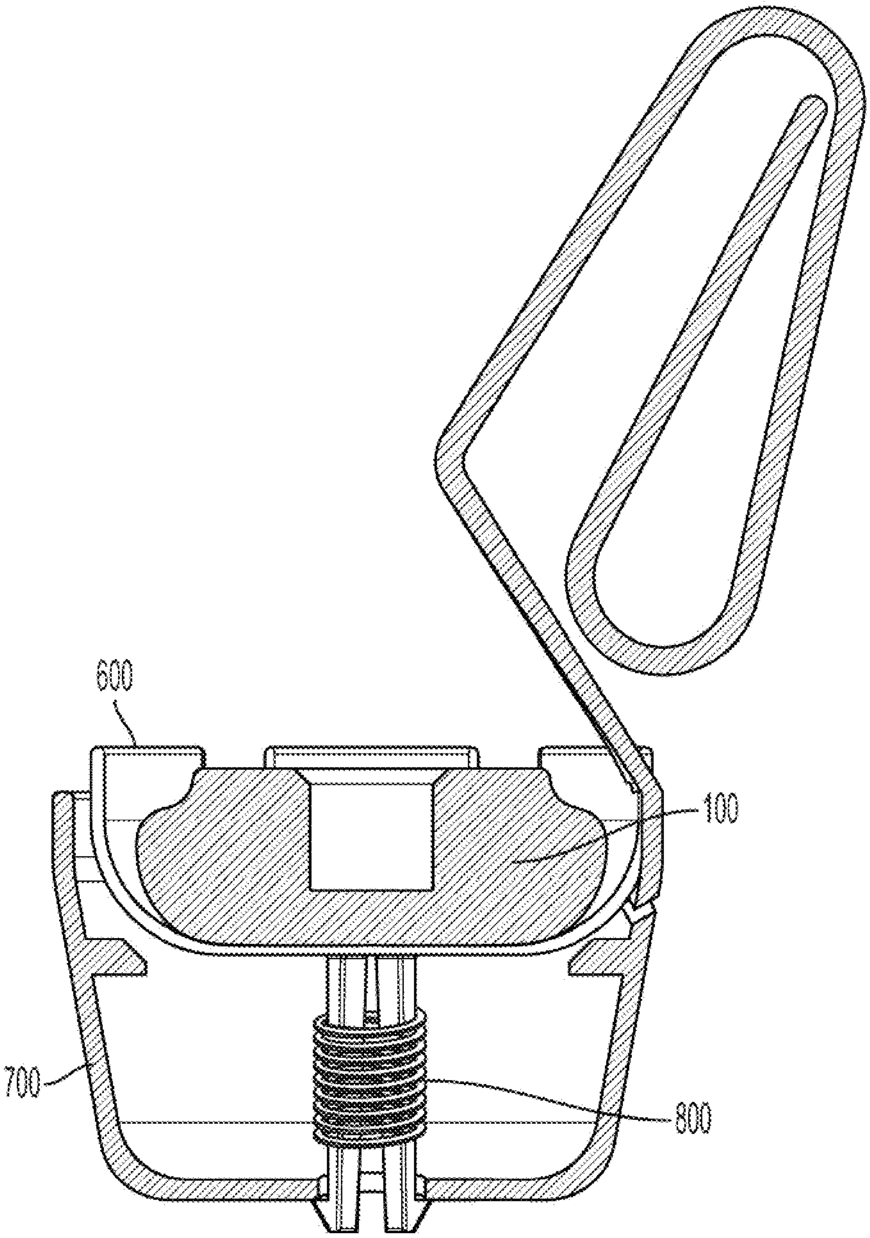
Figure 8D:
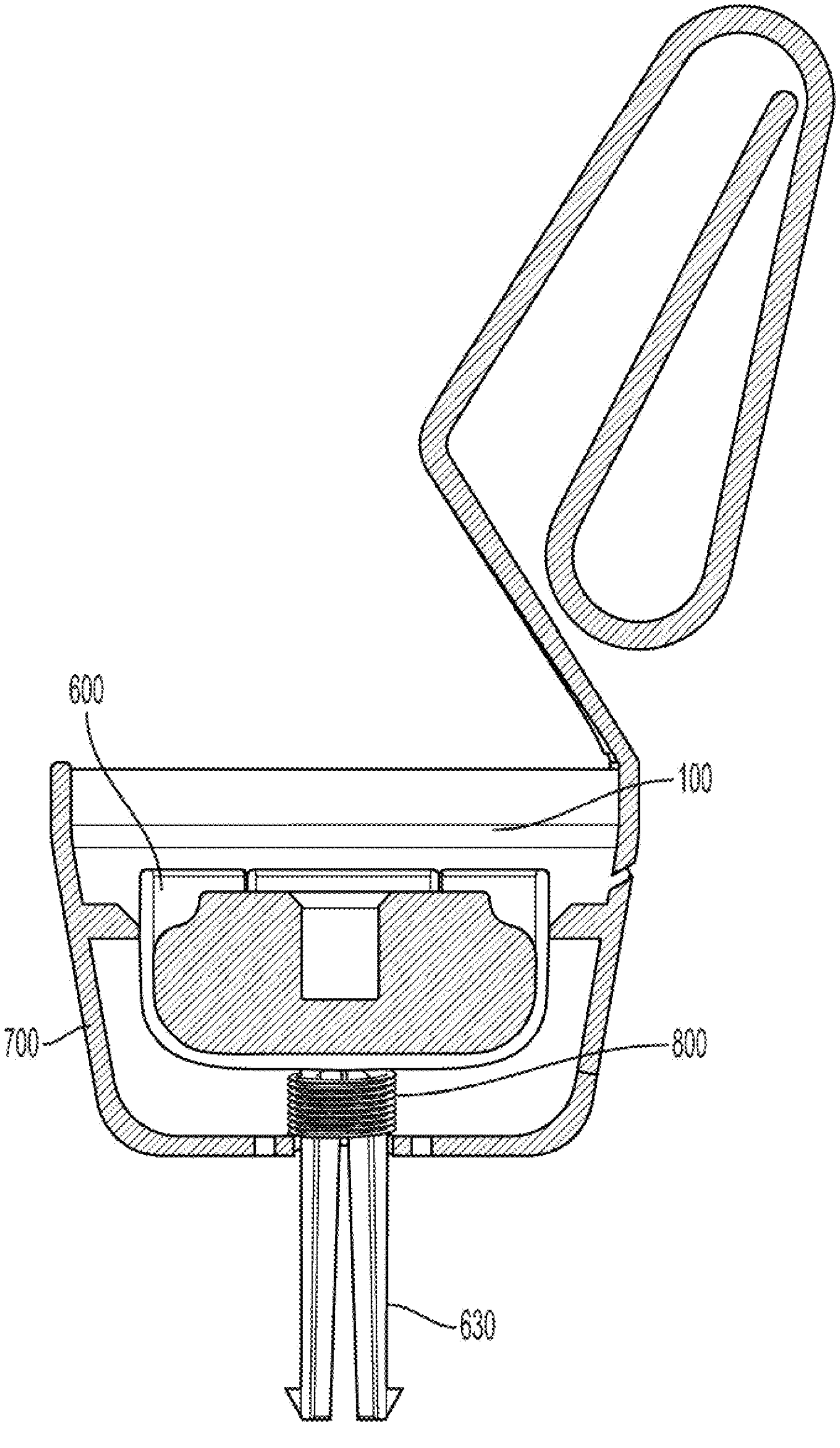
Figure 8E:
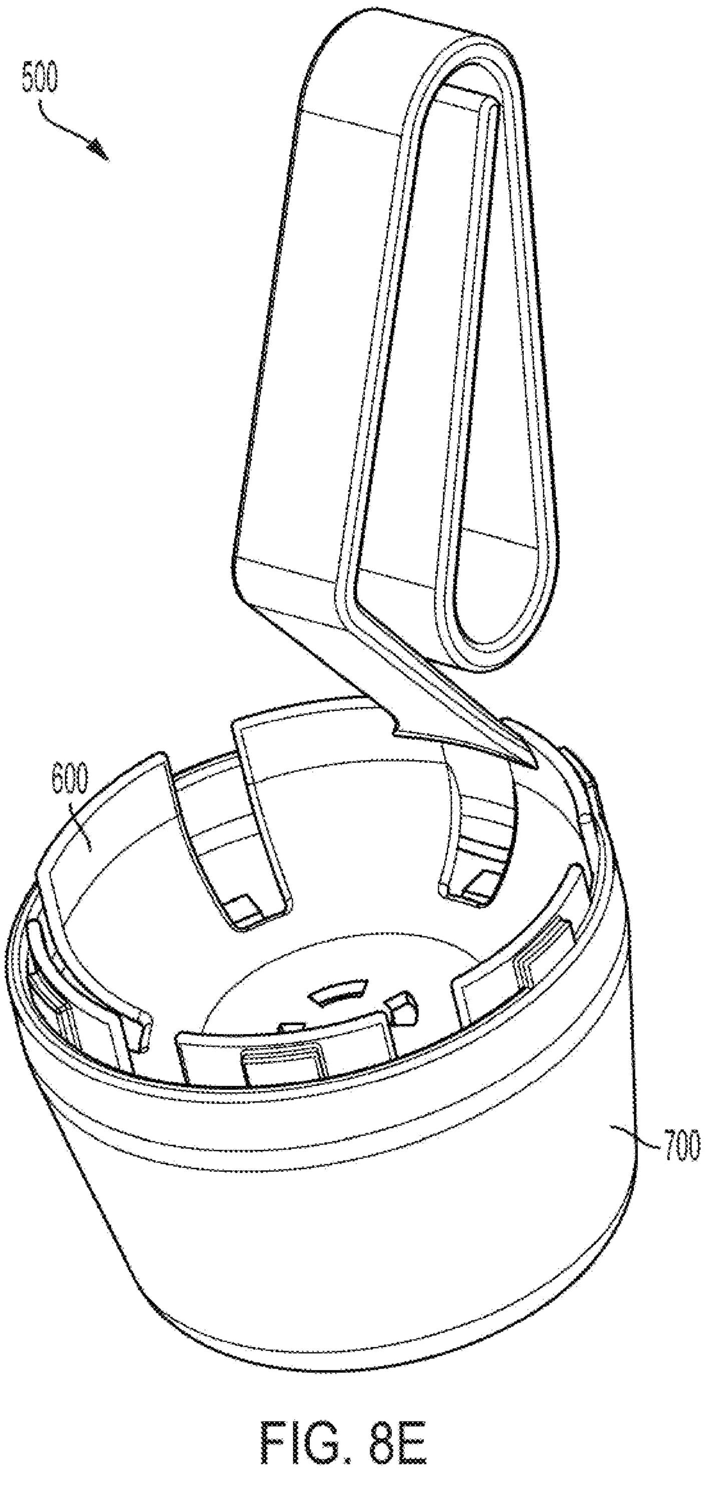

The arm 400 can hook securely over the toilet rim, positioning the storage and molding device 300 within the toilet bowl, as illustrated in FIGS. 7A-7C. The arm 400 can be constructed from the same or a different material than the rest of the storage and molding device 300. In some embodiments, the arm 400 extends from the base 310. This can help the storage and molding device 300 remain stationary even during flushing or when inserting or removing cleaning heads 100. The arm 400 can provide a secure grip on the toilet bowl rim, accommodating various toilet designs while maintaining the storage and molding device's 300 stability.

Referring back to FIG. 4B, the arm 400 can have various structural portions, including a base portion 411, an upper portion 412 connected at an angle to the base portion, a flat portion 413, and an outer portion 414. In some embodiments, the arm's base portion 411 features a curvature that aligns with the exterior surface of a standard toilet bowl. This curvature can aid in securing a more stable and flush fit of the storage and molding device 300 against the toilet bowl. In some embodiments, the arm's base portion 411 extends vertically to an upper portion 412 connected at an angle to the base portion 411. In some embodiments, a flat portion 413 is connected at an angle to the upper portion 412 and extends outwards away from the base 310. In some embodiments, an outer portion 414 is connected at a downward angle to the flat portion 413. In some embodiments, as depicted in FIGS. 7A-7C, the arm 400 can be installed on the rim of the toilet bowl, beneath the toilet seat, by placing the base portion 411 and upper portion 412 on the inside of the toilet bowl, the flat portion 413 along the rim of a toilet bowl, and the outer portion 414 on the exterior of a toilet bowl.

Figure 4A:
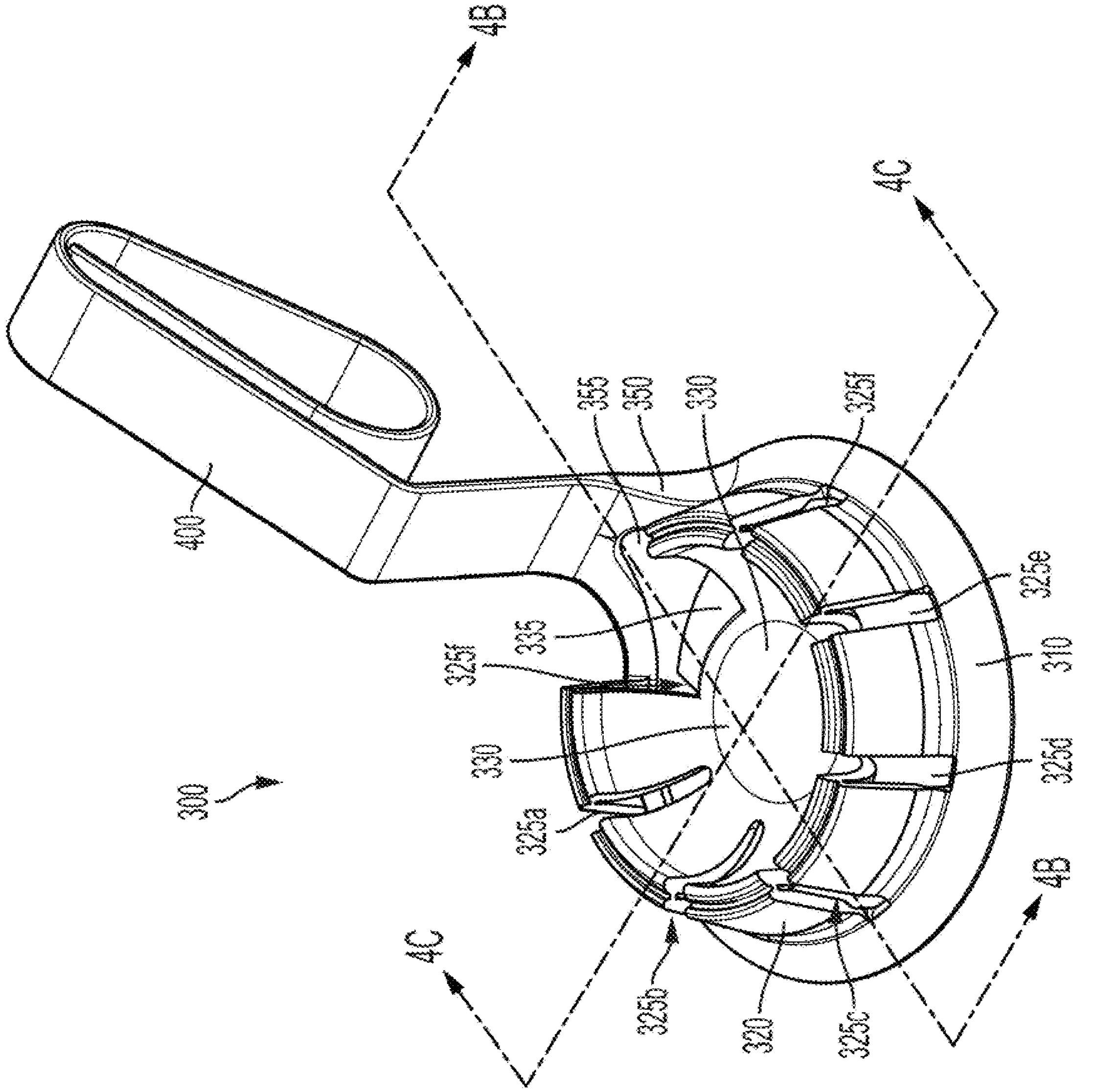
FIGS. 4A-4D are various views of a single-piece storage and molding device, according to an embodiment of the disclosure.
Figure 4B:
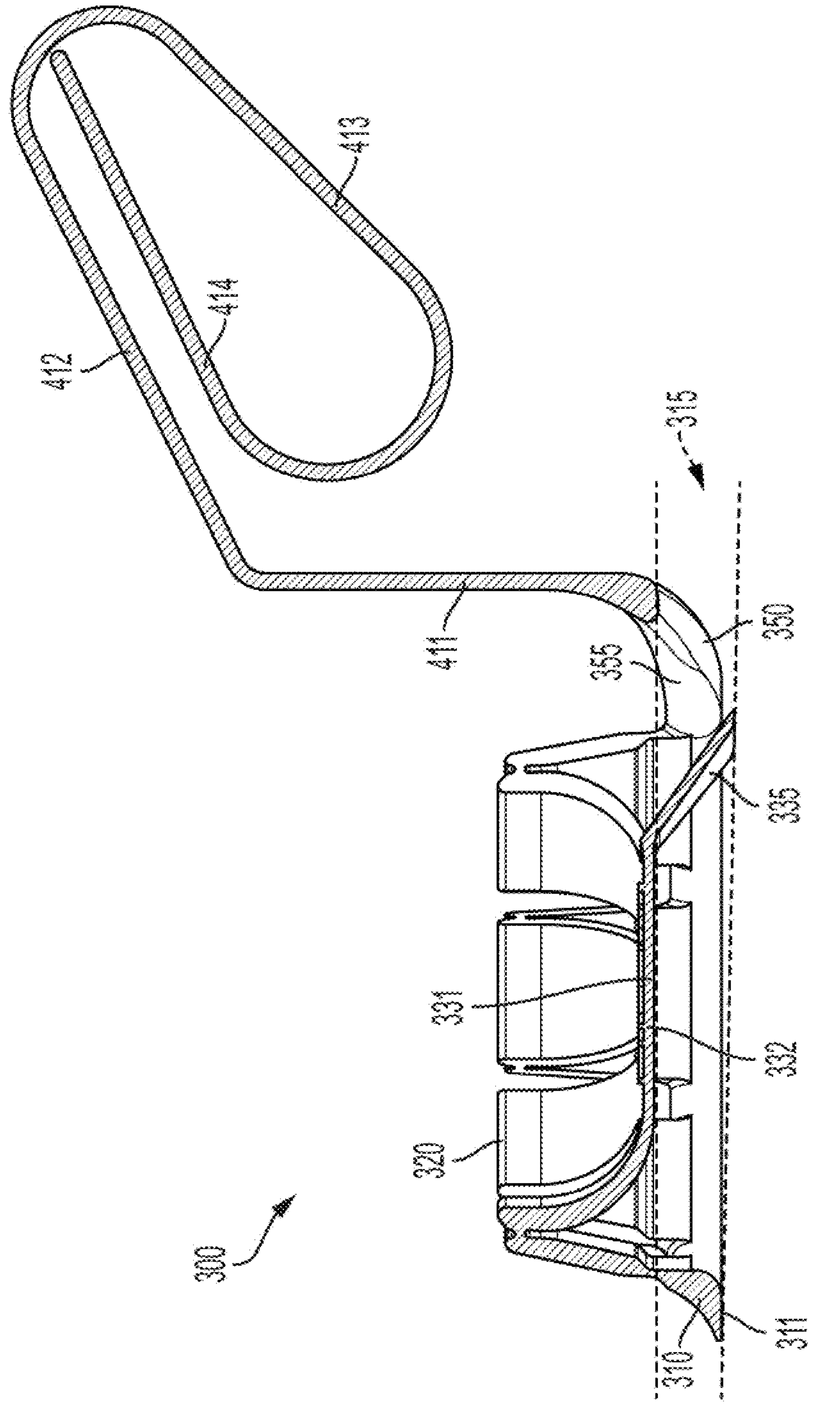
Figure 4D:
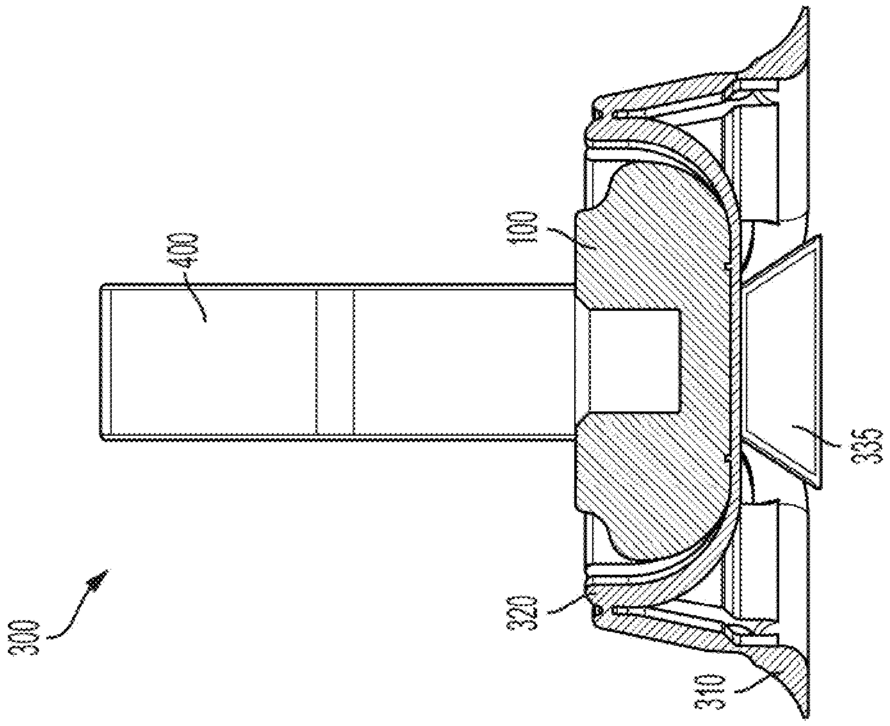
Figure 4C:
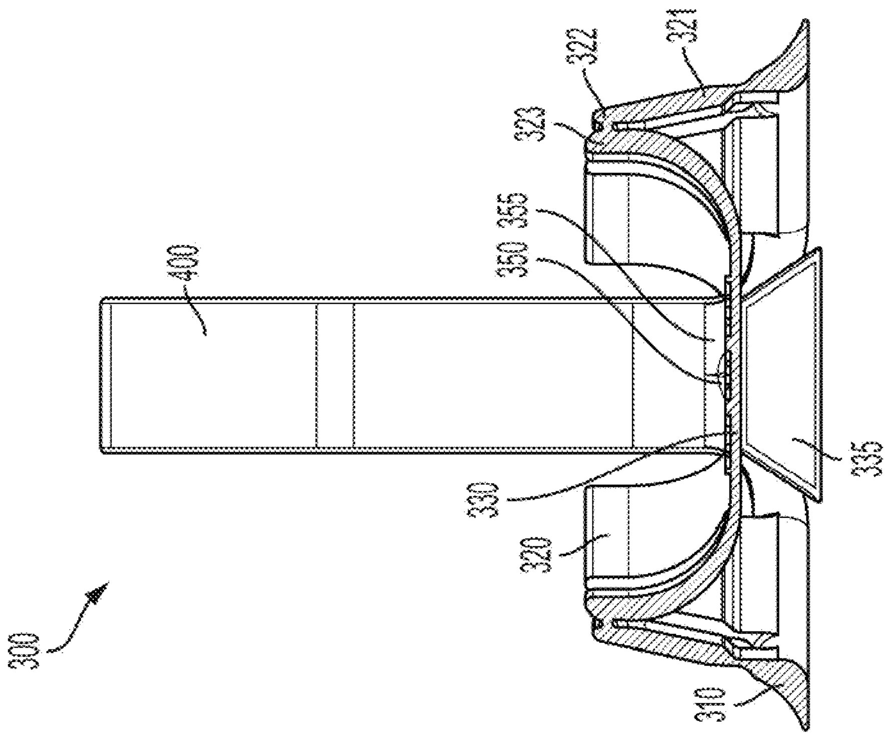

In some embodiments, as depicted in at least FIG. 4B, the arm 400 can be curled within itself. The flat portion 413 can be bent downwards towards the direction of the base 310 and the outer portion 414 can be bent upwards away from the direction of the base 310. In some embodiments, the arm 400 can be curled as such for ease of storage or shipping and uncurled for placement over the rim of the toilet bowl.

In some embodiments, the dimensions of the arm 400 can be optimized to ensure that the storage and molding device 300 is held securely either above or slightly below the toilet water level. The exact position may vary depending on the specific toilet design. This variability in positioning is not limited by the function of the cleaning head 100. Being positioned above the water level allows the cleaning head 100 to emit fragrances, while a positioning slightly below the water level facilitates more intensive cleaning.

In some embodiments, the entire storage and molding device 300, including the arm, are formed by a single piece. In other embodiments, the storage and molding device's 300 arm 400 and base 310 are interconnected via a snap-like connection to accommodate easy attachment and detachment. The snap-like connection may consist of a small, raised ridge on one component (either the base 310 or the base portion 411 of the arm 400) that aligns with a corresponding groove on the other component. The ridge is designed to be inserted into the groove with a slight application of force, triggering an audible or tactile "snap" to confirm a secure connection. This connection has specific tolerances to withstand the mechanical forces associated with operations, such as the insertion or removal of cleaning heads 100. This design also facilitates modularity and ease of maintenance, allowing the user to separate the components for cleaning or replacement without compromising the structural integrity of the overall system.

In some embodiments, the connection between the arm 400 and the base 310 can be achieved by other means. For instance, adhesive compounds could be employed to firmly secure the arm 400 to the base 310. Additionally, mechanical fasteners could be used to connect the arm 400 and the base 310.

The arm 400 can be connected to the base 310. In embodiments where one of the shaping tabs gaps **325*f* is larger than all the others, the arm 400 can be connected to the base 310 proximate the largest gap 325*f*. In these embodiments, the arm 400 may be narrower than the width of the largest gap 325*f* so the arm 400 does not completely block water flow to the cleaning head 100 through the largest gap 325, as best shown in FIG. 4**C.

FIGS. 7A-7C show a single-piece storage and molding device installed on a toilet, according to an embodiment of the present disclosure. The following process can be followed to install and use the storage and molding device 300. The arm 400 can be uncured and placed on the rim of a toilet bowl, as shown in FIGS. 7A and 7B. The cleaning head 100 can be placed inside the storage and molding device 300, as illustrated in FIG. 7C, and a user can insert a projecting portion 210 of a scrubbing handle 200 into the cleaning head's 100 cavity 505 and press the cleaning head 100 towards the base 310 and the toilet bowl wall. As the cleaning head 100 is pressed towards the base 310 and the toilet bowl wall, the receiving surface 330 is also pressed towards the base 310 and the toilet bowl wall, and the shaping tabs 320 surrounding the cleaning head are forced inwardly around the cleaning head 100 (best shown in FIG. 6B), thereby shaping or molding the cleaning head 100 around the projecting portion 210 of the scrubbing handle 200 to connect the cleaning head 100 to the scrubbing handle 200 (best shown in FIG. 5A).

Turning now to FIGS. 8A-10E, the multi-piece embodiment will be described. FIGS. 8A-8E are various views of a multi-piece storage and molding device 500, according to embodiments of the disclosure. The multi-piece storage and molding device 500 can include a tablet cradle 600 and an outer shell 700. Like the single-piece storage and molding device 300, in some embodiments, the storage and molding device 500 can also include an arm 400 to connect it to the rim of a toilet bowl so that the storage and molding device 500 can store a cleaning head 100 in the toilet bowl in between uses connected to a scrubbing handle 200. Further, like the single-piece embodiment 300, the multi-piece storage and molding device 500 can be selectively placed in a storing position and a shaping position, as will be described in further detail below.

FIGS. 9A-9F are various views of a tablet cradle 600, according to an embodiment of the disclosure. The tablet cradle 600 can be placed at least partially within the outer shell 700, as illustrated in FIGS. 8A-8E. After placing a cleaning head 100 into the tablet cradle 600, a user can insert the projecting portion 210 of the scrubbing handle 200 into the cleaning head's 100 cavity 105, and press the cleaning head 100 further into the tablet cradle 600 and the outer shell 700. As the tablet cradle 600 is forced deeper into the outer shell 700, the tablet cradle's 600 shaping tabs 620 surrounding the cleaning head 100 are forced inwardly around the cleaning head 100, thereby shaping or molding the cleaning head 100 around the projecting portion 210 of the scrubbing handle 200 thereby connecting the cleaning head 100 to the scrubbing handle 200.

In some embodiments, a tablet cradle 600 can include an upper surface 610, a plurality of shaping tabs 620, and a spring shaft assembly 630. The plurality of shaping tabs 620 can be arranged around the perimeter of the upper surface 610, with a gap in between each neighboring shaping tab 620. As the tablet cradle 600 is forced deeper into the outer shell 700, and the shaping tabs 620 are thereby forced inwardly, the gaps between neighboring shaping tabs 620 will decrease, in some embodiments, until no gap remains. In this way, in some embodiments, a user can prescribe a particular gap to produce a tablet cradle 600 that will mold cleaning heads 100 to have an outer diameter that does not fall below a particular minimum outer diameter. In some embodiments, the upper surface 610 is circular and the shaping tabs 620 are curved such that the tablet cradle 600 can mold a cleaning head 100 into a disc-shape having a curved side wall.

Figure 9A:
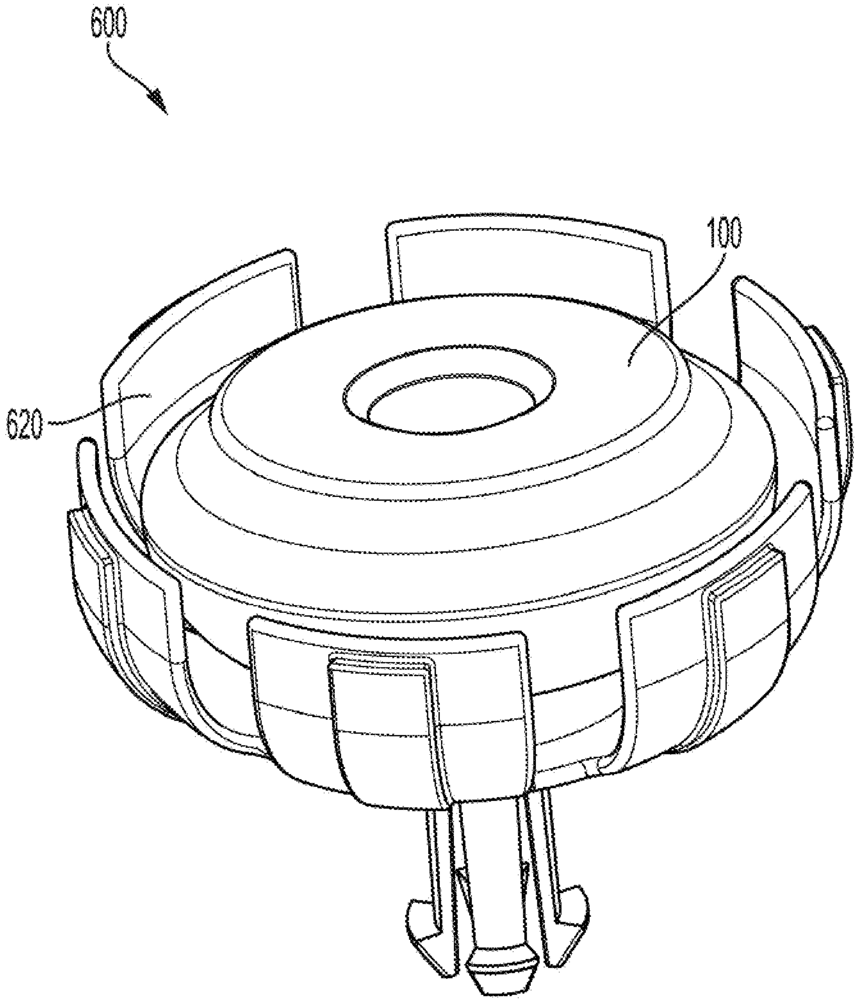
FIGS. 9A-9F are various views of a tablet cradle, according to an embodiment of the disclosure.
Figure 9B:
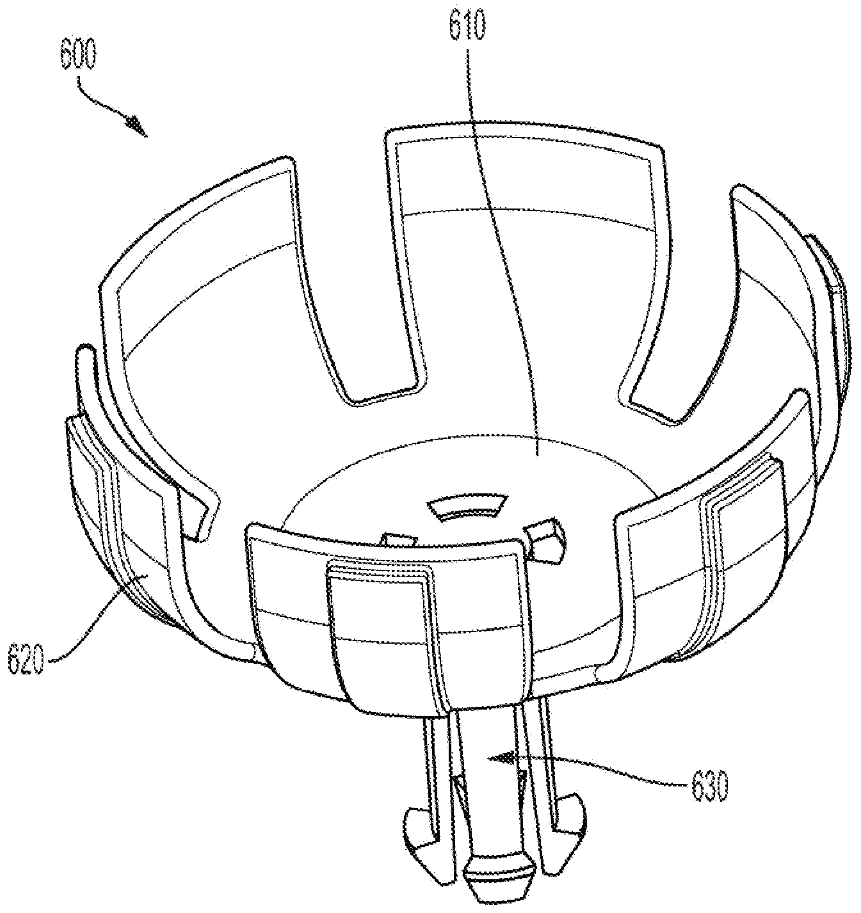
Figure 9D:
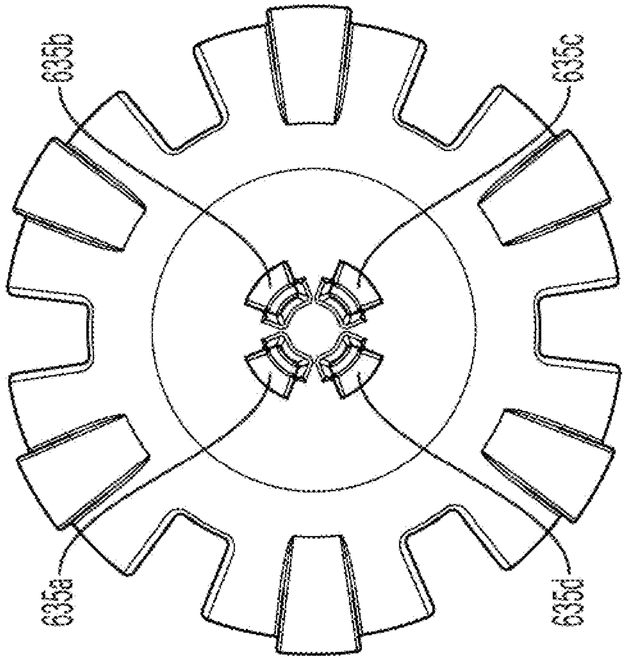

In some embodiments, the tablet cradle 600 can include one or more features that affect how the cleaning head 100 is shaped by the shaping tabs 620. For example, in some embodiments, the thickness of the shaping tabs 620 can vary to facilitate shaping the cleaning head 100. Referring specifically to FIG. 9E, in some embodiments, the shaping tab 620 vary in thickness along their length—being thinnest near where they connect to the upper surface 610 and thickest near their free end, which will affect the resulting shape of the cleaning head 100.

There may be different ways that the shaping tabs 620 can vary in thickness. In some embodiments, the thickness can progressively increase from the upper surface 610 to a free end, or a location proximate the free end, while in other embodiments, the thickness may progressively increase for a certain length, and then maintain a uniform thickness to the free end, or a location proximate the free end, an example of which is illustrated in FIG. 2E. However, the subject matter disclosed herein is not so limited. As one of ordinary skill in the art will appreciate, many other variations are possible, including, for example, having only two thicknesses.

Figure 9C:
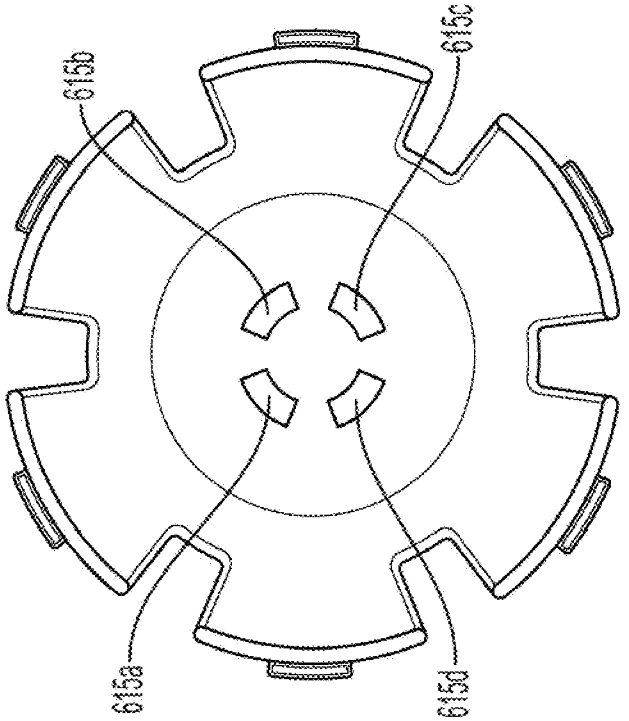
Figure 9F:
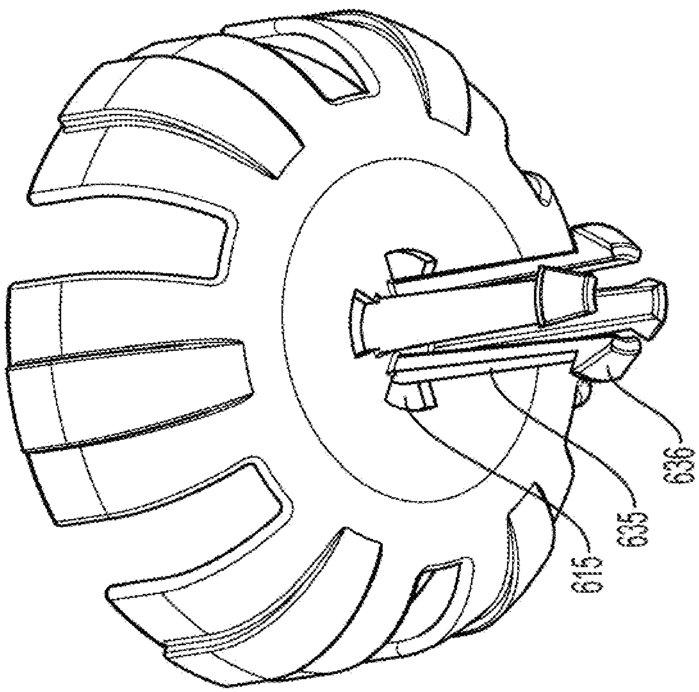
Figure 9E:
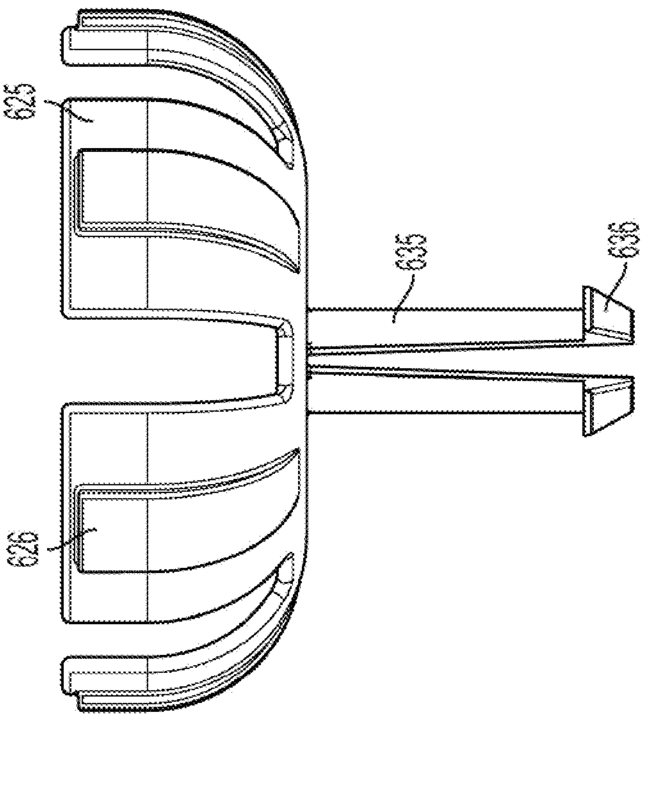

Referring specifically to FIGS. 9C and 9E, in some embodiments, the thickness of the shaping tabs 620 may also very across its width. For example, referring to FIG. 9E, a shaping tab 620 may have a base portion 625 of uniform thickness, and a ridge portion 626 at a middle area of the base portion 625 of varying thickness. By varying the thickness of only one area of the shaping tab 620 as opposed to the whole shaping tab 620, less material is needed to manufacture the shaping tab 620.

Referring now to FIG. 9B in particular, in some embodiments, the tablet cradle 600 includes a spring shaft assembly 630. Referring back to FIGS. 8C and 8D, the spring shaft assembly 630 can extend outwardly from the upper surface 610 and through the shaft aperture 716 of the outer shell 700. Referring back to FIGS. 9E and 9F, the spring shaft assembly 630 can include a stopper ledge 636 to prevent the spring shaft assembly 630 from traveling out of the outer shell's 700 shaft aperture 716.

Referring again to FIGS. 8C and 8D, in some embodiments, a spring 800 can be installed around the spring shaft assembly 630, between the upper surface 610 of the tablet cradle 600 and the bottom surface 710 of the outer shell 700. In this configuration, the spring 800 compresses as the tablet cradle 600 is placed into the shaping position, and less at least partially relaxes (e.g., decompresses) as the tablet cradle 600 is placed in the storing position. As one of ordinary skill in the art will appreciate, in this configuration, the spring 800 urges the tablet cradle 600 into its storing position such that the storing position is the "default" position and external force is required to place the tablet cradle 600 in the shaping position.

In some embodiments, the spring shaft assembly 630 can have features that enable it to be connected to the outer shell 700 without manufacturing the tablet cradle 600 and the outer shell 700 together. For example, as illustrated in FIGS. 9F, in some embodiments, the spring shaft assembly 630 includes four spring shaft pieces 635 arranged concentrically about the center of the upper surface 610. One or more of the spring shaft pieces 635 can have stopper ledges 636 to prevent the tablet cradle 600 from traveling out of the shaft aperture 716 of the outer shell 700, as discussed above.

To connect the spring shaft assembly 630 to the outer shell 700, a user can push all of the spring shaft pieces 635 together to narrow the springs shaft assembly's 230 outer dimensions, and force the spring shaft assembly 630 through the shaft aperture 716 in the outer shell 700. Once the stopper ledges 636 have traveled through the shaft aperture 716 such that they are on the outside of the outer shell 700, the user can release his/her grip on the spring shaft pieces 635, and the spring shaft assembly 630 can return to its larger outer dimensions. Once returned to its larger outer dimensions, the stopper ledges 636 can prevent the tablet cradle 600 from becoming disconnected from the outer shell 700 by traveling out of the shaft aperture 716. Although four spring shaft pieces 635, each with its own stopper ledge 636, are shown, the subject matter disclosed herein is not so limited. Instead, as one of ordinary skill in the art will appreciate, more or fewer spring shaft pieces are possible, and fewer than all spring shaft pieces may have a stopper ledge.

Returning to FIG. 9C, in some embodiments, the upper surface 610 of the tablet cradle 600 has a plurality of drainage holes 615. These drainage holes 615 can be desirable to prevent premature dissolution of the cleaning head 100. For example, the drainage holes 615 allow airflow to dry a wet cleaning head 100. For another example, the drainage holes 615 prevent the tablet cradle 600 from filling with stagnant water from, e.g., flushing operations.

In some embodiments, the drainage holes 615 can be arranged concentrically about the center of the upper surface 610 of the tablet cradle 600. In some embodiments, such as the embodiment illustrated in FIG. 9F, a spring shaft piece 635 may connect to the upper surface 610 next to the drainage hole 615 such that part of the drainage hole's 215 perimeter forms part of the spring shaft piece's 635 perimeter. This may be desirable form a manufacturing perspective.

Figure 10A:
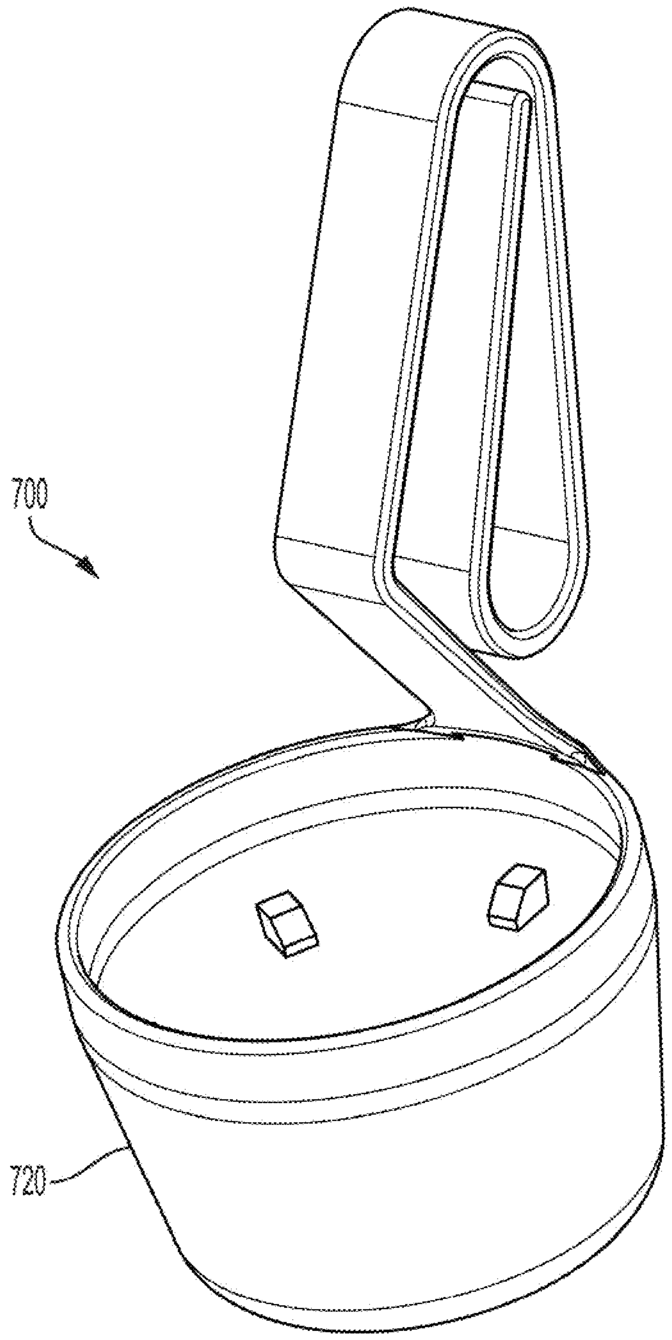
FIGS. 10A-10E are various views of an outer shell, according to an embodiment of the disclosure.
Figure 10C:
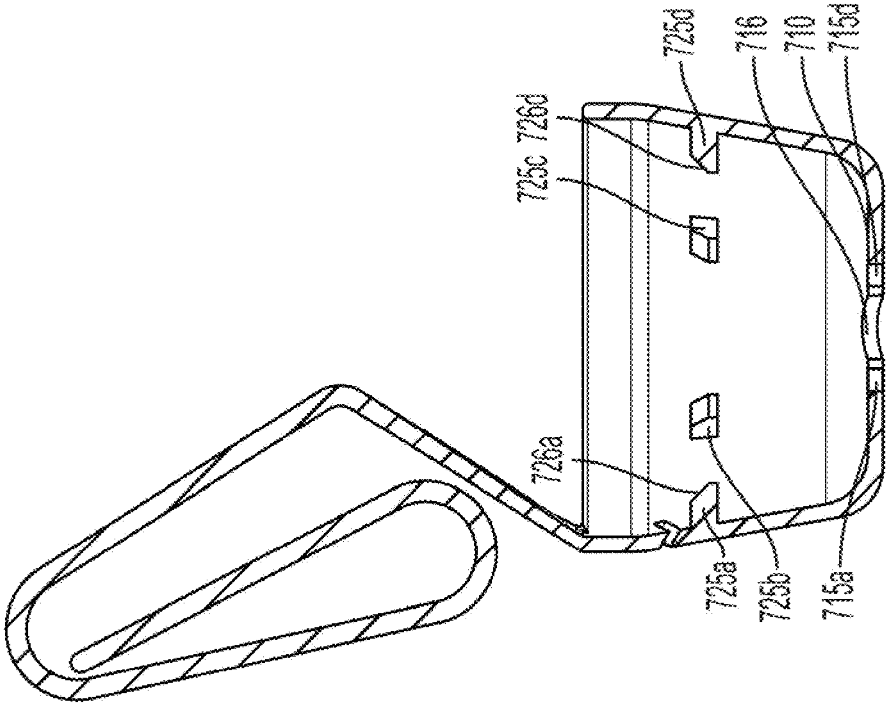
Figure 10B:
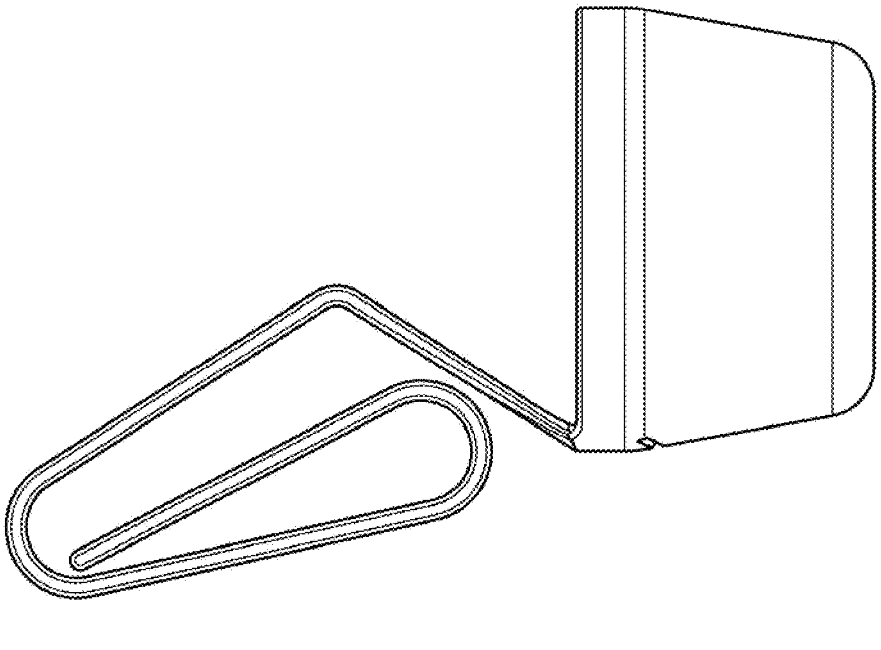
Figure 10E:
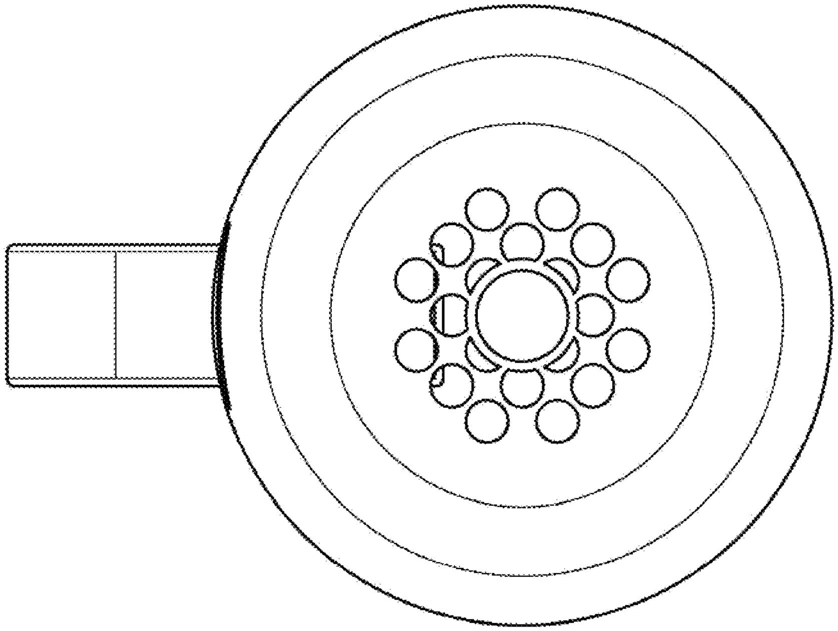
Figure 10D:
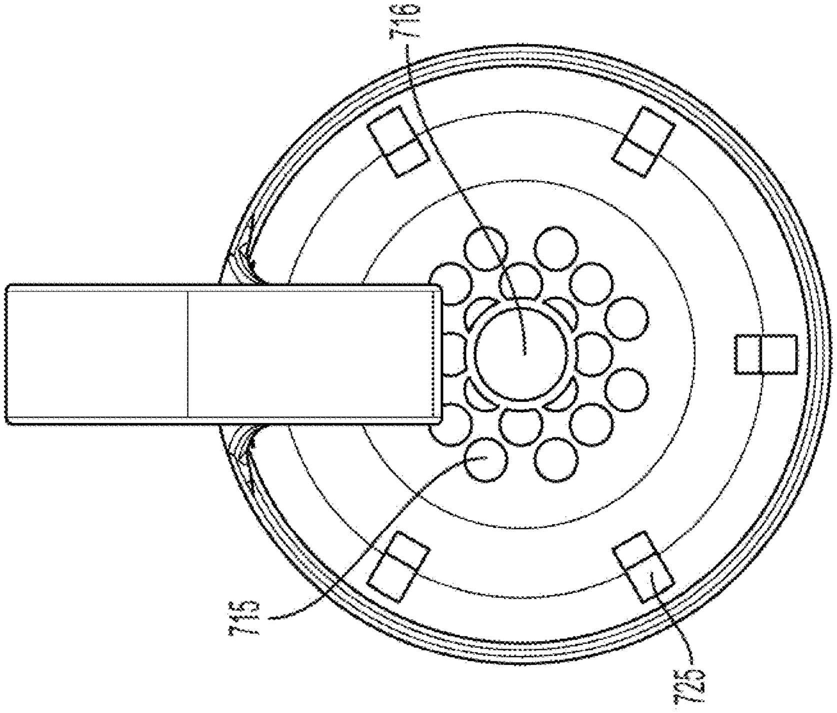

FIGS. 10A-10E are various views of an outer shell 700, according to an embodiment of the disclosure. FIG. 10E is a bottom view of the outer shell 700. In some embodiments, an outer shell 700 can have a bottom surface 710, a side wall 720, and an arm 400 to connect the outer shell 700 to the rim of a toilet bowl. In the embodiments illustrated in FIGS. 10A-10E, the arm 400 is shown curled; it can be uncurled to wrap around the rim of a toilet bowl.

In some embodiments, the bottom surface 710 has one or more holes. For example, in some embodiments, the bottom surface 710 can have several drainage holes 715. Similar to the drainage holes in the tablet cradle 600, these drainage holes 715 can be desirable to prevent premature dissolution of the cleaning head 100 because they can allow airflow to dry a wet cleaning head 100 and prevent the outer shell 700, and as a result, the tablet cradle 600, from filling with stagnant water from, e.g., flushing operations. In addition, in some embodiments, the bottom surface 710 can have a shaft aperture 716 through which the spring shaft assembly 630 of the tablet cradle 600 can travel, as discussed above.

In some embodiments, the outer shell 700 has one or more features to force the shaping tabs 620 of the tablet cradle 600 inwardly as the tablet cradle 600 is forced deeper into the outer shell 700. For example, in some embodiments, the outer shell's 700 side wall 720 is angled—with its largest diameter at the entrance to the outer shell 700 and its smallest diameter at its bottom surface 710, as illustrated in FIG. 10C. As the tablet cradle 600 is forced deeper into the outer shell 700, the tablet cradle 600 is forced into a smaller and smaller diameter, forcing its shaping tabs 620 more and more inward.

For another example, and referring still to FIG. 10C, in some embodiments, the outer shell 700 has inner projections 725 to force the shaping tabs 620 inward. In the embodiment shown in FIG. 3D, the outer shell 700 has six inner projections 725 arranged concentrically about the center of the outer shell 700. As illustrated in FIG. 3C, in some embodiments, the inner projections 725 have outer faces 726 that are angled inwardly towards the center of the outer shell 700. As the tablet cradle 600 is forced deeper into the outer shell 700, the inner projections 725 progressively force the shaping tabs 620 inward around the cleaning head 100. In some embodiments, the outer shell 700 has both angled walls and inner projections 725 to force the shaping tabs 620 inwardly around the cleaning head 100.

Referring back to FIGS. 8C and 8D, the storage and molding device 500 can be selectively placed into one of two positions: a shaping position (e.g., FIG. 8C) and a storing position (e.g., FIG. 8D). In its shaping position the tablet cradle's 600 shaping tabs 620 are forced inwardly around the cleaning head 100. When a projection from a scrubbing handle is within the cavity of the cleaning head 100 in the shaping position, the shaping tabs 620 will force the cleaning head material inward causing the cavity of the cleaning head 100 to push up against, and conform to, the outer surface area of the projection, thereby connecting the cleaning head 100 to the scrubbing handle. In its "storing position" the shaping tabs 620 of the tablet cradle 600 are not forced inwardly around the cleaning head 100. Instead, they are "open" such that a cleaning head 100 can easily be placed in or retrieved from the tablet cradle 600 without interference from the shaping tabs 620.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. No claim element herein is to be construed under the provisions of 35 U.S.C. 112(f) unless the element is expressly recited using the phrase "means for."

As used herein, the terms "a" or "an" means "at least one" or "one or more" unless the context clearly indicates otherwise. Unless defined otherwise, all technical and scientific terms have the same meaning as is commonly understood by one of ordinary skill in the art to which the embodiments disclosed belong. As used herein, the term "about" means that the numerical value is approximate and small variations would not significantly affect the practice of the disclosed embodiments. Where a numerical limitation is used, unless indicated otherwise by the context, "about" means the numerical value can vary by +10% and remain within the scope of the disclosed embodiments. As used herein, the term "percentage" or "%" of a component refers to the weight percentage (w/w) of the component, which is the weight of the component over the total weight of the composition. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

We claim:

1. A scrubbing tool system comprising:

a handle for holding by a user in a cleaning operation, wherein the handle comprising a projecting portion;

a moldable and dissolvable cleaning head comprising a cavity to mate with the projecting portion to attach the cleaning head to the handle, wherein the cleaning head comprises a moldable material that dissolves in water, and wherein the moldable materials comprises a cleaning agent; and a storage and molding device that is movable from a storing position to a shaping position to attach the cleaning head to the handle, the storage and molding device comprising:

a base, a receiving surface, wherein a first gap exists between the base and the receiving surface, and a plurality of shaping tabs connecting the receiving surface and the base, wherein the plurality of shaping tabs curve up from the receiving surface thereby forming with the receiving surface a cup in which the cleaning head is received, and wherein the plurality of shaping tabs arranged such that a respective tab gap exists between shaping tabs in the storing position, and wherein moving the storage and molding device to the shaping position causes the plurality of shaping tabs to deflect inwardly and reduces the size of the first gap.

2. The scrubbing tool system of claim 1, wherein in the shaping position the cleaning head is pushed by the handle into the receiving surface causing the plurality of shaping tabs to deflect inwardly and compress side walls of the cleaning head to conform the cavity to the projecting portion.

3. The scrubbing tool system of claim 1, wherein the projecting portion further comprises one or more flexible rings extending radially from the projecting portion, and wherein in the shaping position material of the cleaning head is forced on either side of one or more of the one or more flexible rings to more securely attach the cleaning head to the handle.

4. The scrubbing tool system of claim 1, wherein the projecting portion further comprises a non-flexible flange connected to the projecting portion at a location proximate a proximal end of the projecting portion, and wherein in the shaping position material of the cleaning head is forced around a lower surface area and an outer perimeter of the non-flexible flange to reduce water intrusion into the cavity.

5. The scrubbing tool system of claim 1, wherein the storage and molding device further comprises an arm attached to the base and comprising a hook to attach the storage and molding device on a rim of a toilet bowl.

6. The scrubbing tool system of claim 5, wherein the storage and molding device further comprising a ramp connected to the receiving surface and extending towards the base and the hook such that the ramp directs flow from a flushing operation travels up the ramp and towards the cup to contact the cleaning head.

7. The scrubbing tool system of claim 1, wherein each of the plurality of shaping tabs comprise:

an outer section having a first outer end connected to and extending upwardly from the base, and an inner section having a first inner end connected to and extending upwardly from the receiving surface and a second inner end connected to a second outer end of the outer section forming a living hinge connecting the inner section to the outer section.

8. The scrubbing tool system of claim 1, wherein moving the storage and molding device to the shaping position reduces sizes of the respective tab gaps such that adjacent shaping tabs are closer to each other.

9. A storage and molding device comprising:

a base;

a receiving surface, wherein a first gap exists between the base and the receiving surface; and a plurality of shaping tabs connecting the receiving surface and the base, wherein the plurality of shaping tabs curve up from the receiving surface thereby forming with the receiving surface a cup in which a moldable and dissolvable cleaning head is received, wherein the storage and molding device is movable from a storing position to a shaping position to attach the cleaning head to a handle, and wherein the plurality of shaping tabs arranged such that a respective tab gap exists between shaping tabs in the storing position, and wherein moving the storage and molding device to the shaping position causes the plurality of shaping tabs to deflect inwardly and reduces the size of the first gap.

10. The storage and molding device of claim 9, further comprising an arm attached to the base and comprising a hook to attach the storage and molding device on a rim of a toilet bowl.

11. The storage and molding device of claim 10, further comprising a ramp connected to the receiving surface and extending towards the base and the hook such that the ramp directs flow from a flushing operation up the ramp and towards the cup to contact the cleaning head.

12. The storage and molding device of claim 11, where the arm angles away from the base and forms therein an opening through which flow can travel towards the ramp.

13. The storage and molding device of claim 9, wherein each of the plurality of shaping tabs comprise:

an outer section having a first outer end connected to and extending upwardly from the base, and an inner section having a first inner end connected to and extending upwardly from the receiving surface and a second inner end connected to a second outer end of the outer section forming a living hinge connecting the inner section to the outer section.

14. The storage and molding device of claim 9, wherein moving the storage and molding device to the shaping position reduces sizes of the respective tab gaps such that adjacent shaping tabs are closer to each other.

* * * * *